US010572862B2

(12) United States Patent
Robinson et al.

(10) Patent No.: US 10,572,862 B2
(45) Date of Patent: Feb. 25, 2020

(54) CREDIT MANAGEMENT METHOD AND SYSTEM

(71) Applicant: Earned LLC, Longmont, CO (US)

(72) Inventors: Timothy L. Robinson, Alexandria, VA (US); Bradford R. Schildt, Longmont, CO (US)

(73) Assignee: Earned LLC, Longmont, CO (US)

( * ) Notice: Subject to any disclaimer, the term of this patent is extended or adjusted under 35 U.S.C. 154(b) by 0 days.

(21) Appl. No.: 15/886,737

(22) Filed: Feb. 1, 2018

(65) Prior Publication Data

US 2019/0095883 A1 Mar. 28, 2019

Related U.S. Application Data

(60) Provisional application No. 62/563,321, filed on Sep. 26, 2017.

(51) Int. Cl.
*G06Q 20/10* (2012.01)
*G06Q 20/34* (2012.01)
*G06Q 40/00* (2012.01)
*G06Q 40/02* (2012.01)

(52) U.S. Cl.
CPC .............. *G06Q 20/10* (2013.01); *G06Q 20/34* (2013.01); *G06Q 40/02* (2013.01); *G06Q 40/125* (2013.12)

(58) Field of Classification Search
CPC ........ G06Q 40/02; G06Q 20/10; G06Q 40/00; G06Q 20/40; G06Q 20/04
See application file for complete search history.

(56) References Cited

U.S. PATENT DOCUMENTS

| 5,950,179 A | 9/1999 | Buchanan et al. |
| 6,158,657 A | 12/2000 | Hall et al. |
| 6,631,358 B1 | 10/2003 | Ogilvie |

(Continued)

FOREIGN PATENT DOCUMENTS

AU 2002349979 A1 * 4/2003 ............. G06Q 20/10

OTHER PUBLICATIONS

Business Editors: "Texas Capital Bank Launches New Payroll Platform; Western Union Cash Card to Provide a More Efficient Payroll Alternative for Texas Businesses." Business Wire [New York], Nov. 12, 1999: 1.*

*Primary Examiner* — Virpi H Kanervo
(74) *Attorney, Agent, or Firm* — Thomas J. Lavan

(57) ABSTRACT

A method is provided. The method includes one or more of receiving an application for a card account from a consumer, authorizing the transfer of funds from a primary account to a secondary account, determining an available spending limit for the card account based on total accrued fractional earnings, approving one or more purchase transactions for the card account not greater than the available spending limit, and adjusting the available spending limit based on total accrued fractional earnings, a purchase balance, and the secondary account balance. The primary account stores earnings for the consumer and the secondary account includes a secondary account balance for storing funds to pay a card account statement balance. The primary and secondary accounts include one of separate accounts or a common account. Total accrued fractional earnings include a sum of fractional earnings and fractional earnings include a predetermined fraction of consumer earnings.

20 Claims, 23 Drawing Sheets

Transaction Flow Process

(56) References Cited

U.S. PATENT DOCUMENTS

| | | |
|---|---|---|
| 7,249,092 B2 | 7/2007 | Dunn et al. |
| 7,254,556 B2 | 8/2007 | Fry |
| 7,577,604 B2 | 8/2009 | Ogilvie |
| 7,966,255 B2 | 6/2011 | Wong et al. |
| 8,073,776 B2 | 12/2011 | Wong et al. |
| 8,392,331 B2 | 3/2013 | Ross et al. |
| 8,458,094 B2 | 6/2013 | Macklin |
| 8,676,708 B1 | 3/2014 | Honey |
| 9,330,415 B1 | 5/2016 | Castleman et al. |
| 2004/0225545 A1 | 11/2004 | Turner et al. |
| 2006/0259362 A1* | 11/2006 | Cates .............. G06Q 30/02 705/14.17 |
| 2007/0136194 A1 | 6/2007 | Sloan |
| 2009/0043663 A1 | 2/2009 | Prater |
| 2012/0310824 A1* | 12/2012 | Liberty ............ G06Q 40/02 705/40 |
| 2013/0080227 A1 | 3/2013 | Maskatia et al. |
| 2014/0095289 A1 | 4/2014 | Mobberley |
| 2015/0105902 A1 | 4/2015 | Maskatia et al. |
| 2016/0117714 A1* | 4/2016 | Salihu ............ G06Q 30/0232 705/14.31 |
| 2016/0371661 A1* | 12/2016 | Shah .............. G06Q 10/105 |

* cited by examiner

Fig. 1 Data Communication Network
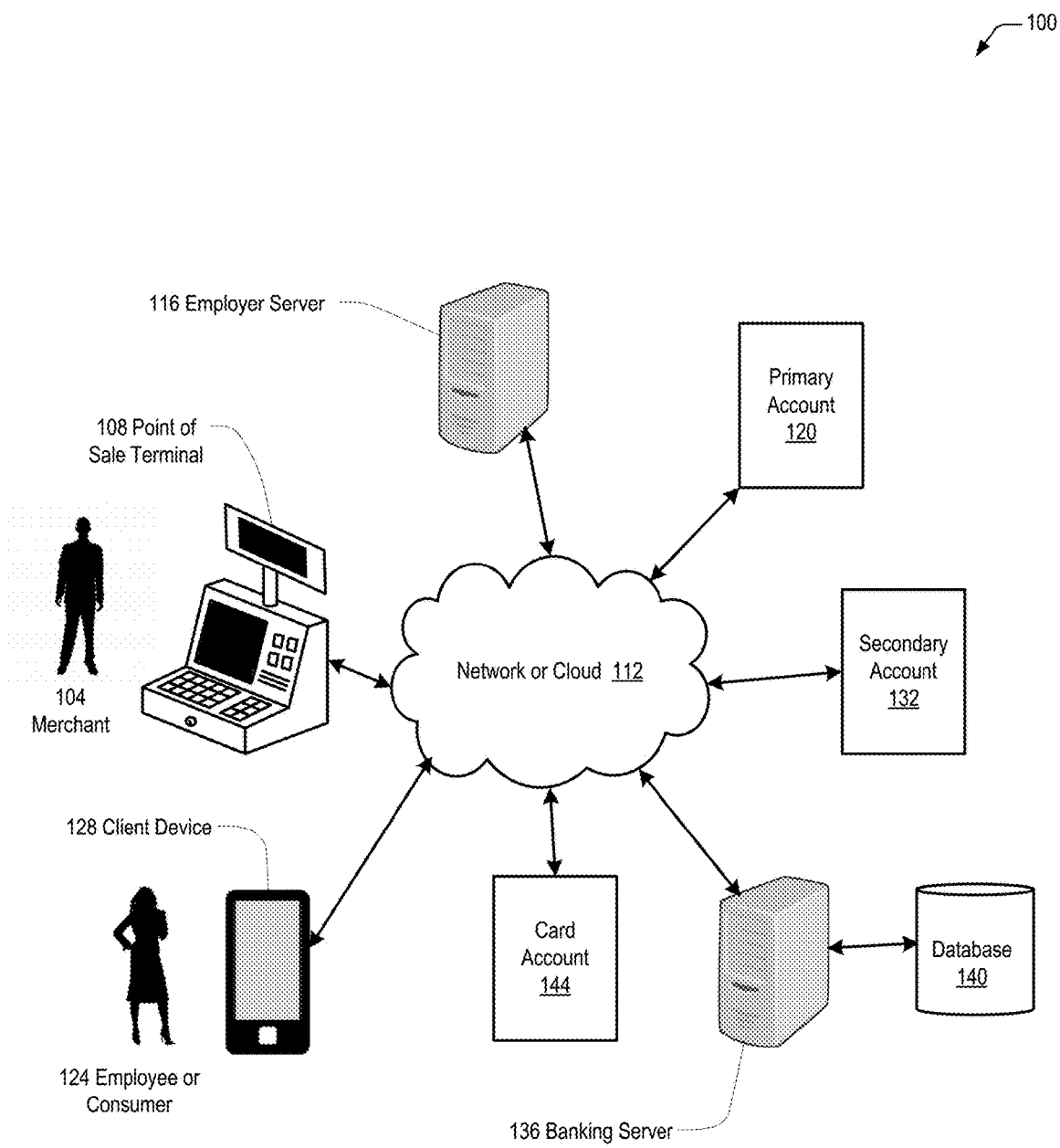

Fig. 2 Server Block Diagram
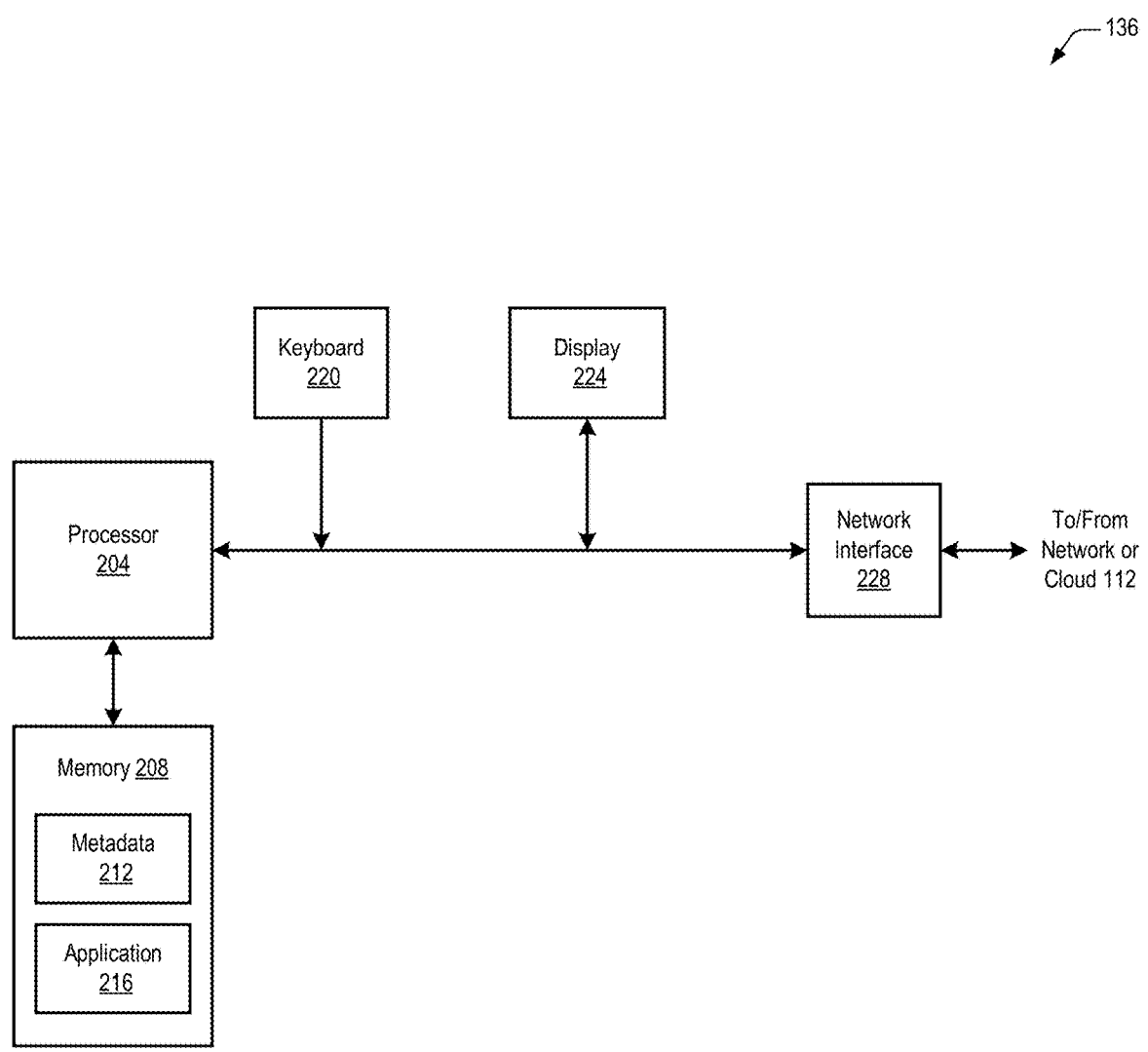

Fig. 3 Client Device Block Diagram
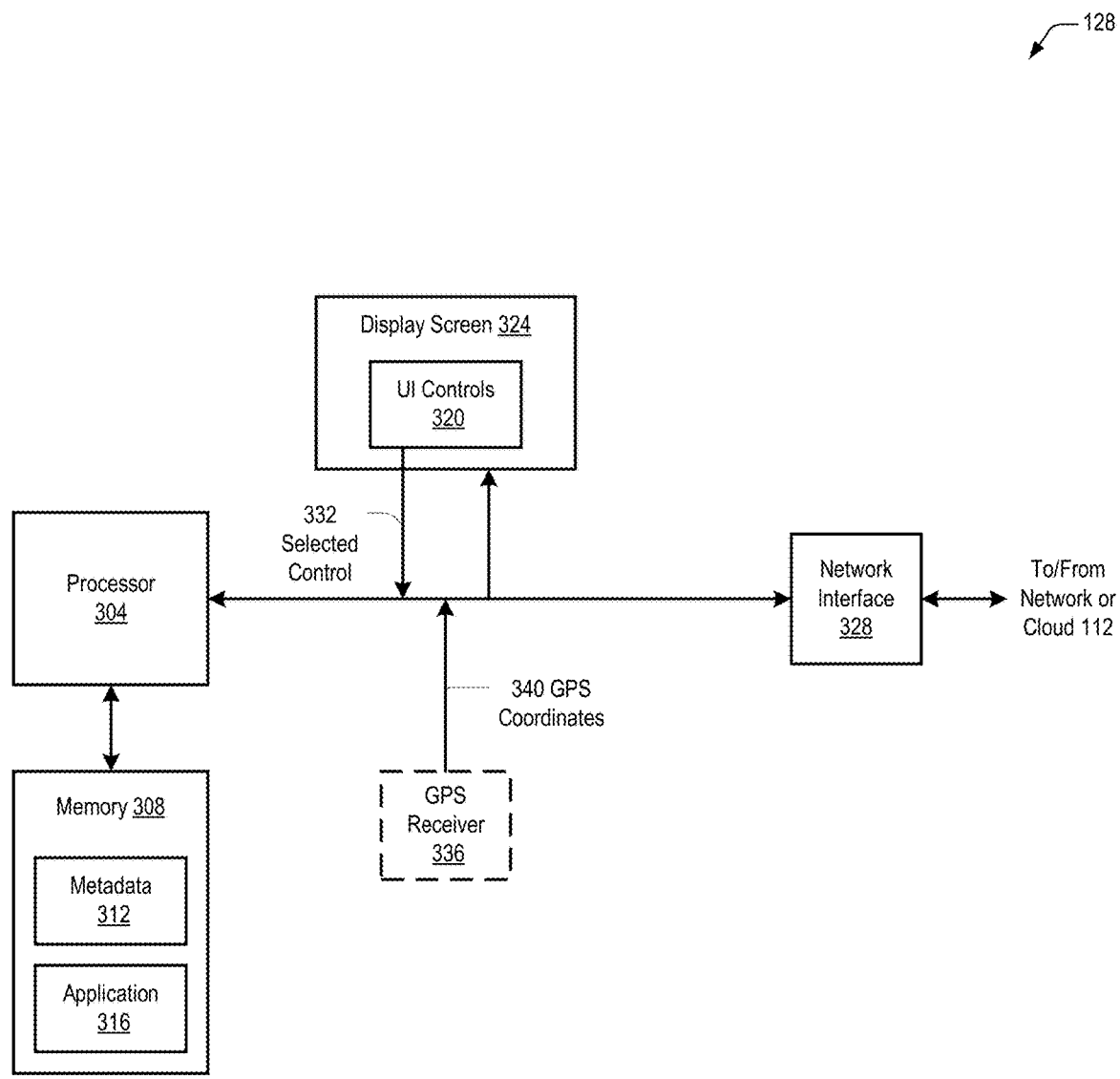

Fig. 4 Credit-Related Metadata
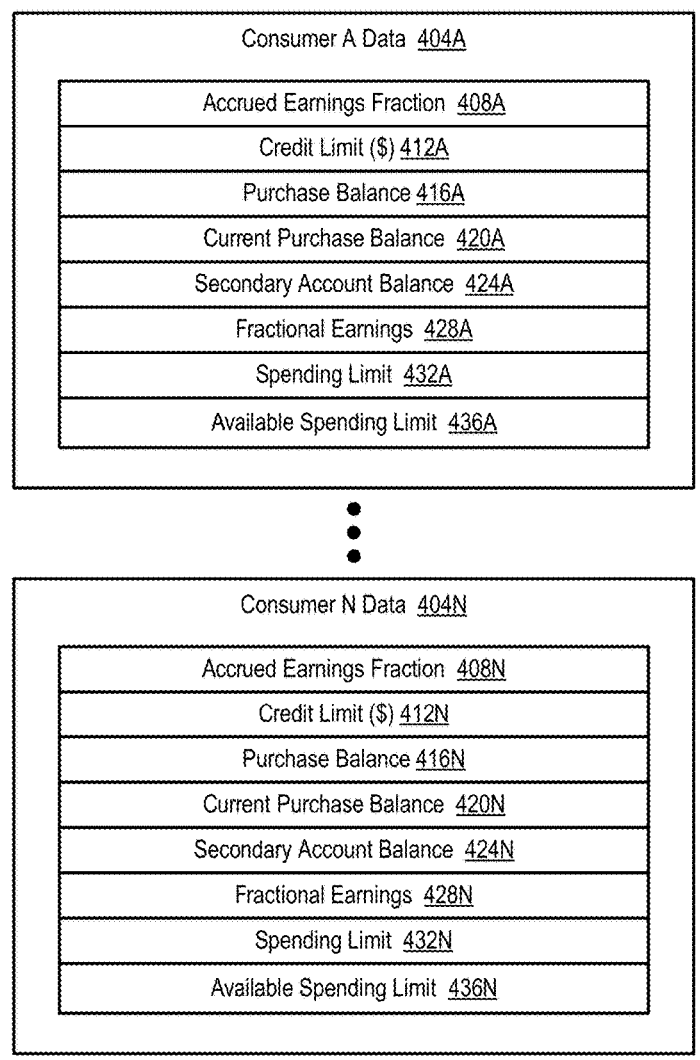

Fig. 5A  Credit-Related Calculations $$\begin{cases} \text{Fractional Earnings 428} = \text{Daily Earnings 504} * \text{Accrued Earnings Fraction 408} \\ \text{Total Accrued Fractional Earnings 512} = \Sigma(\text{Fractional Earnings 428 for which a Consumer has not yet been paid}) \end{cases}$$

$$\begin{cases} \text{Spending Limit 432} = \text{Credit Limit 412} + \text{Total Accrued Fractional Earnings 512} + \text{Secondary Account Balance 424} \\ \text{Spending Limit 432} = \text{Credit Limit 412} + (\text{Total Accrued Fractional Earnings 512} > \text{Credit Limit 412}) + \text{Secondary Account Balance 424} \\ \text{Spending Limit 432 resets each Payday 728 to the Credit Limit 412} \end{cases}$$

$$\begin{cases} \text{Purchase Balance 416} = \Sigma(\text{All Purchases made to date that haven't yet been paid off}) \\ \text{Current Purchase Balance 420} = \text{Purchase Balance 416} - \text{Secondary Account Balance 424} \end{cases}$$

Available Spending Limit 436 = Spending Limit 432 − Purchase Balance 416

Card Account Statement Balance Due 516 = Purchase Balance 416 for Card Statement Period 520, Paid on Card Statement Due Date 524

$$\begin{cases} \text{Each Payday, Transfer the Lesser of (Current Purchase Balance 420 for the day before Payday) and (Total Accrued Fractional Earnings 512 on Last Day of Pay Period) from Primary to Secondary Account} \\ \text{Each Payday, Consumer is presented the Current Purchase Balance 420. Consumer decides and selects to pay on/between a minimum of the Current Purchase Balance 420 at the end of the Most Recent Pay Period and a maximum of the Current Purchase Balance 420 on the Payday, from Primary to Secondary Account} \end{cases}$$

Fig. 5B Credit-Related Timing for Payday in Payment Period
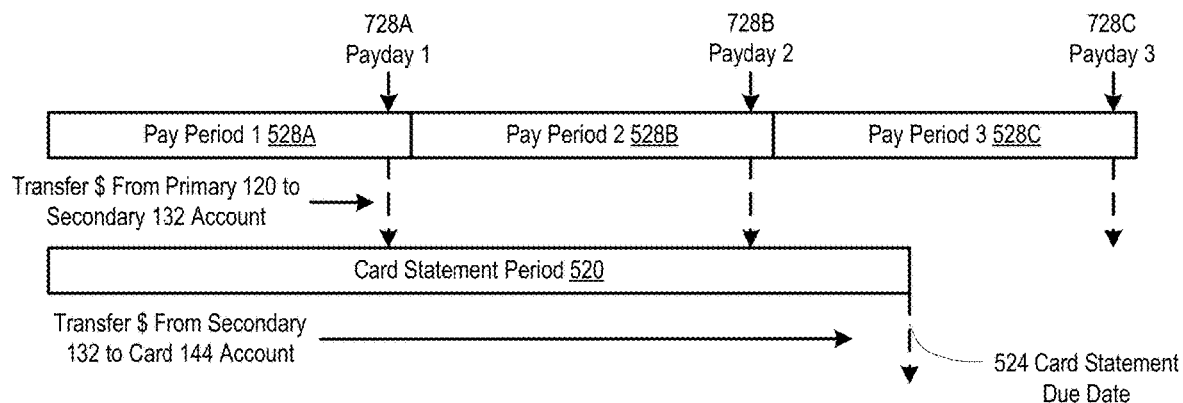
Fig. 5C Credit-Related Timing for Payday After Payment Period
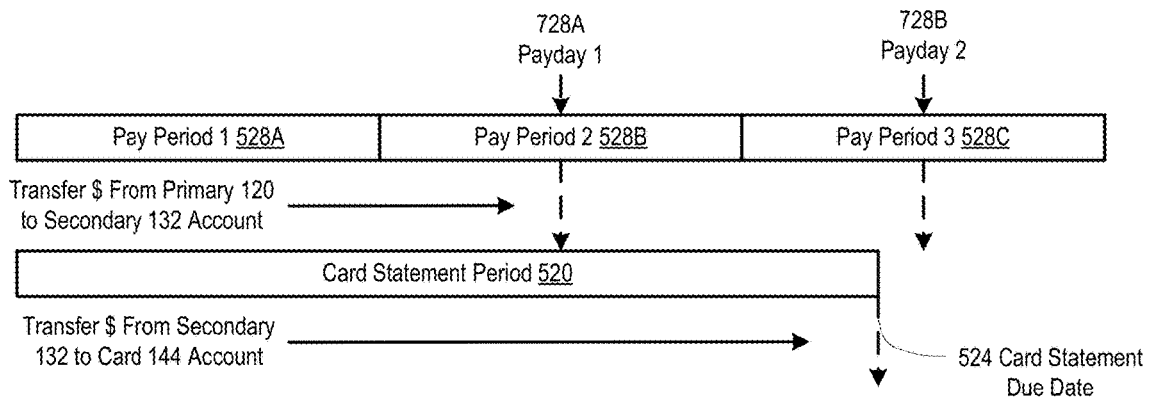

Fig. 6A  Example Calculation of Accrued Earnings Fraction

Accrued Earnings Fraction 408 = $\frac{\text{(3 Month Rolling Average of Earnings − Financial Obligations)}}{\text{3 Month Rolling Average of Earnings}}$ 3 Month Rolling Average of Earnings = 3 Month Rolling Average of Hours Worked X Hourly Wage Financial Obligations = Rent Payment + Car Payment + Student Loan Payment + Regular Payment

Fig. 6B  Example Calculation of Accrued Earnings Fraction

Worker works 140 hours for 1$^{st}$ Month, 150 hours for 2$^{nd}$ Month, and 155 hours for 3$^{rd}$ Month Worker Hourly Wage is $15/hour Rent Payment is $1000/month, Car payment is $500/month, Student Loan payment is $200/month 3 Month Rolling Average of Hours Worked is $\frac{140 + 150 + 155}{3} = \frac{445 \text{ hours}}{3} = 148.33$ hours 3 Month Rolling Average of Earnings = 148.33 hours X $15/hour = $2,225

Financial Obligations = $1000 + $500 + $200 = $1,700

Accrued Earnings Fraction 408 = $\frac{(\$2{,}225 - \$1{,}700)}{\$2{,}225} = \frac{\$525}{\$2{,}225} = 0.236 = 23.6\%$

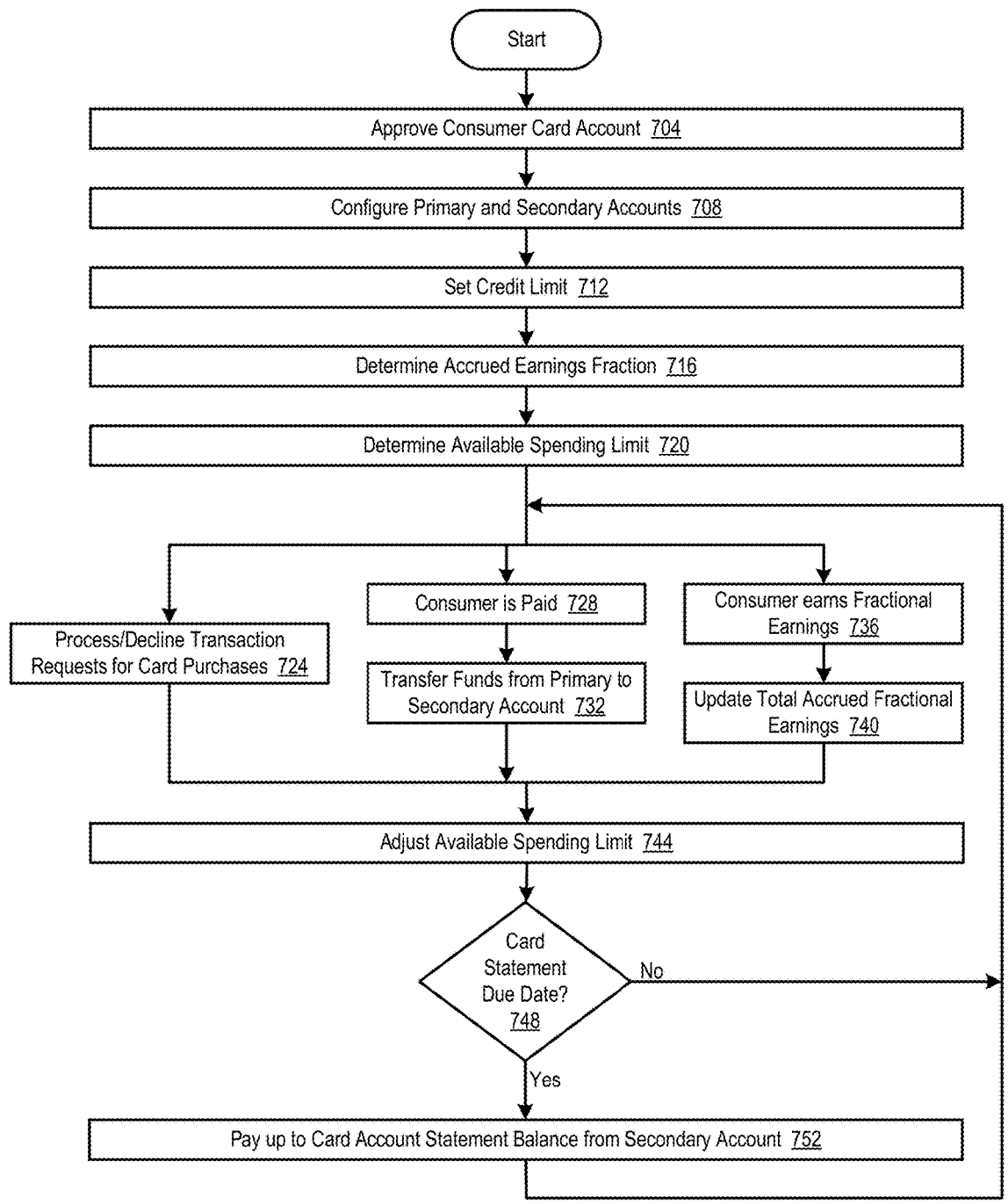
Fig. 7 Transaction Flow Process

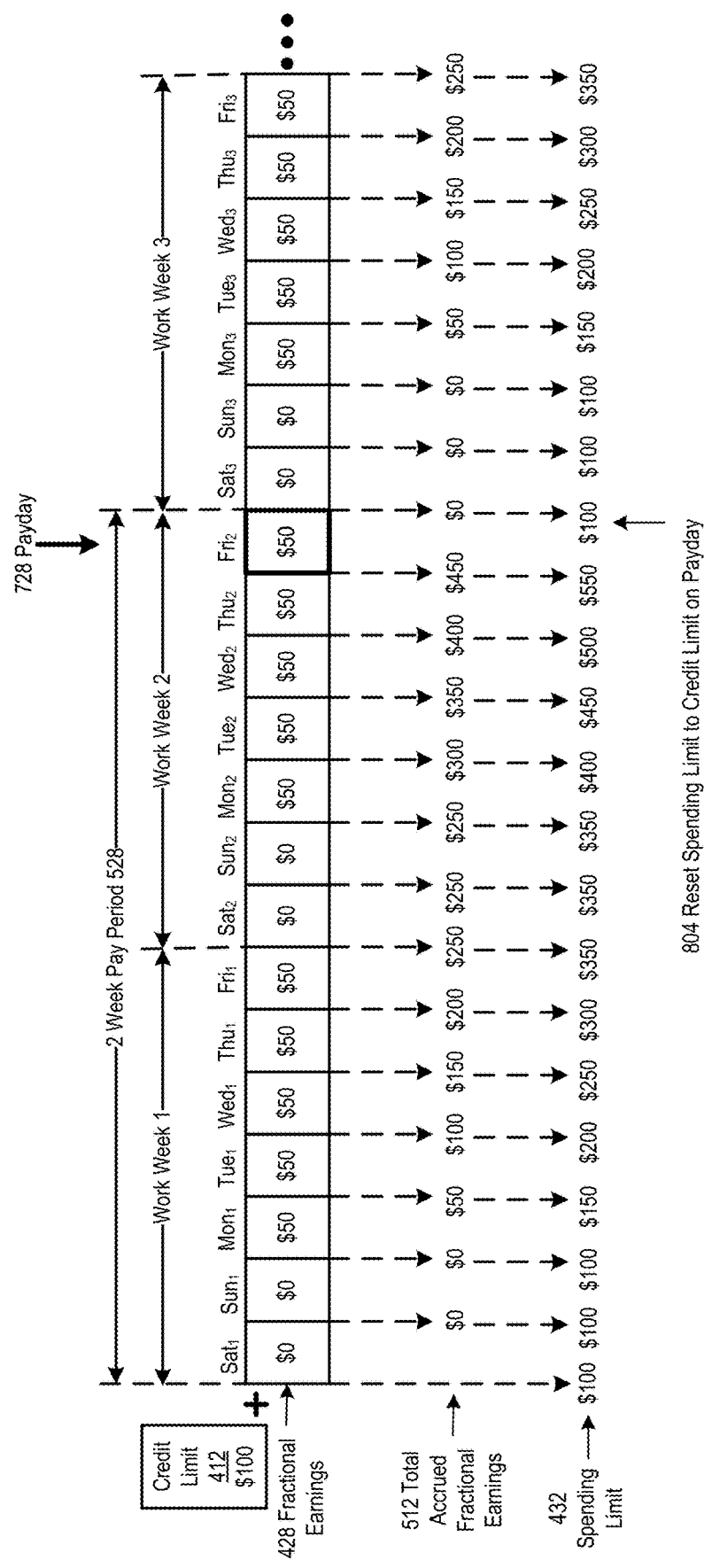
Fig. 8A Credit Example Based on Salaried Earnings

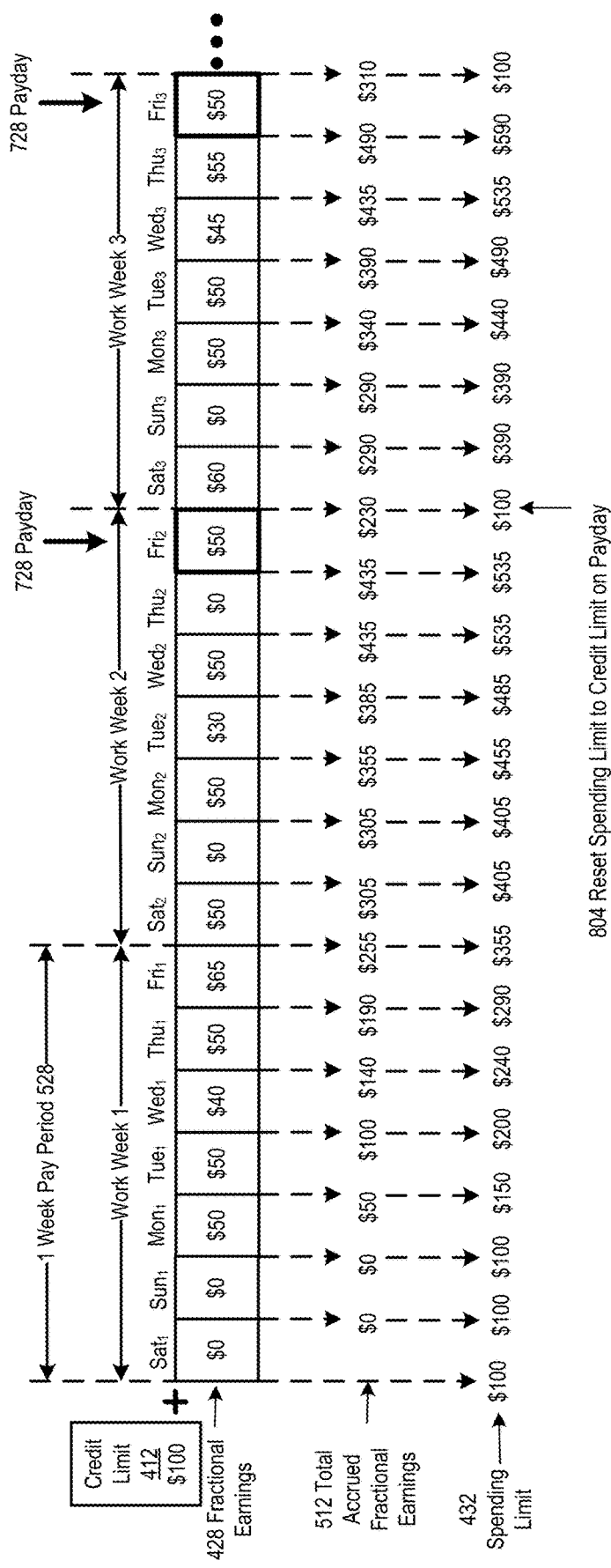
Fig. 8B Credit Example Based on Hourly Earnings

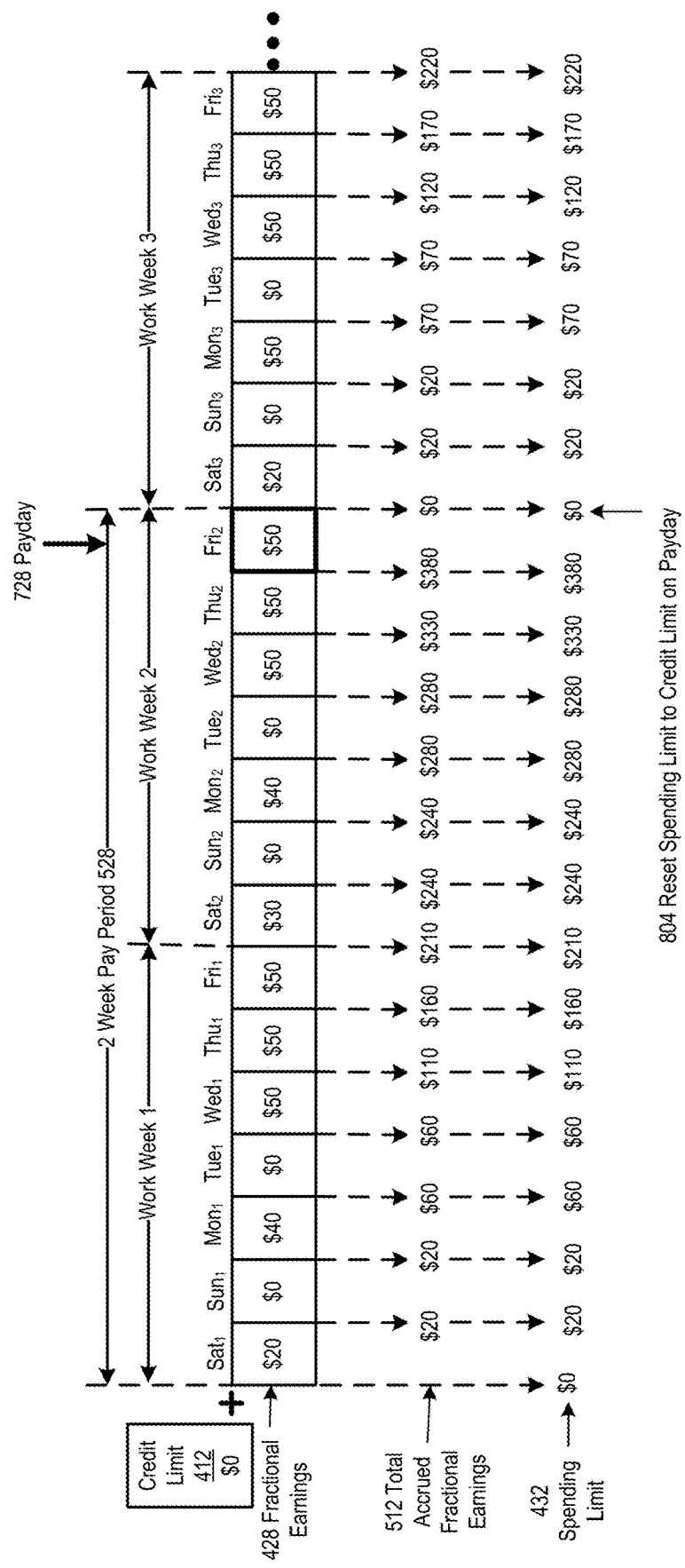
Fig. 8C Credit Example Based on Hourly Earnings

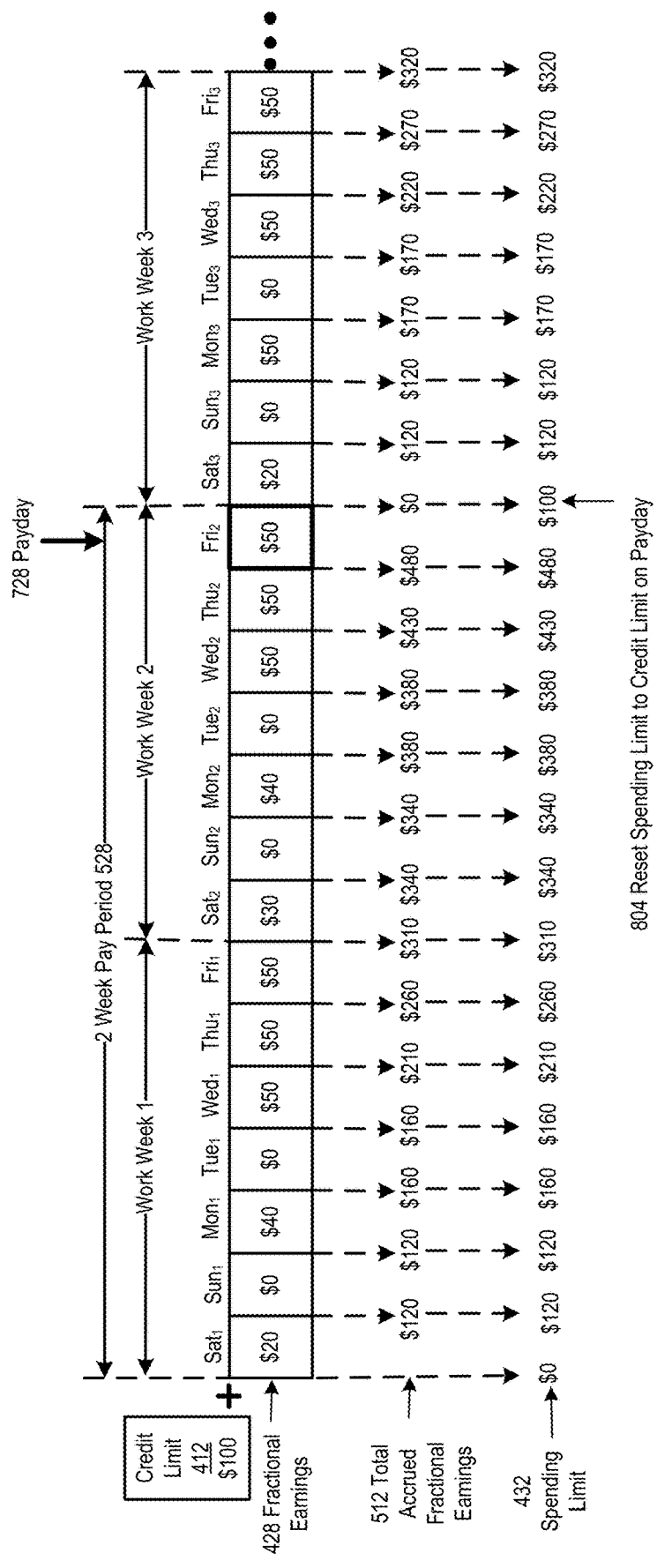
Fig. 8D Credit Example Based on Hourly Earnings

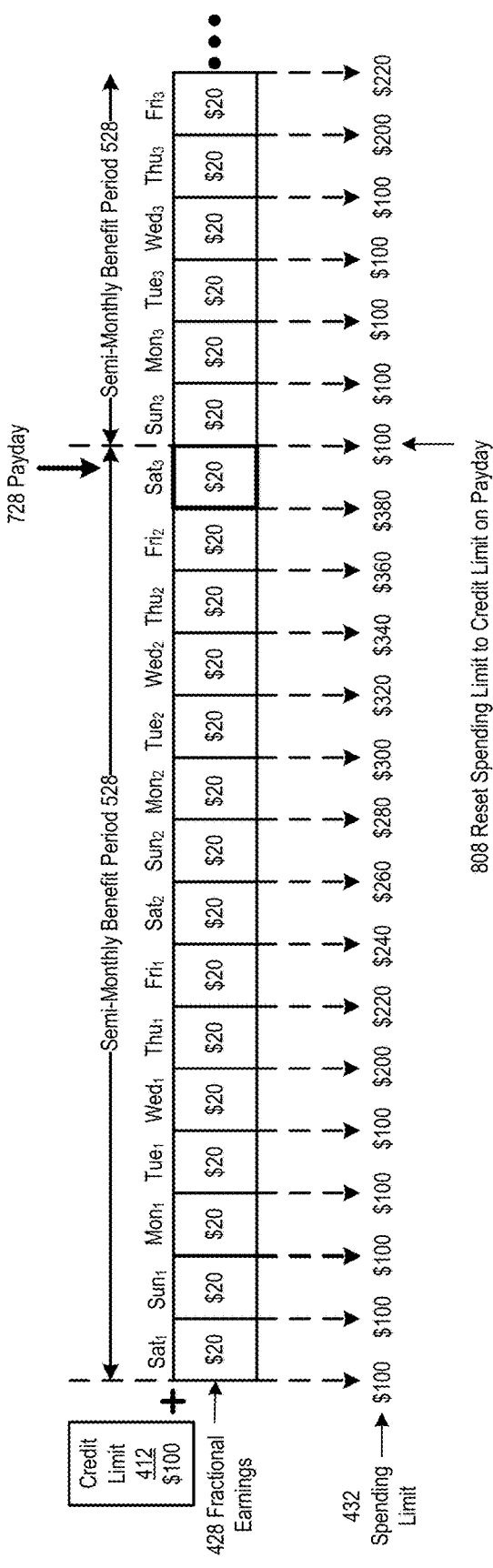
Fig. 8E Credit Example Based on Semi-Monthly Government Benefits
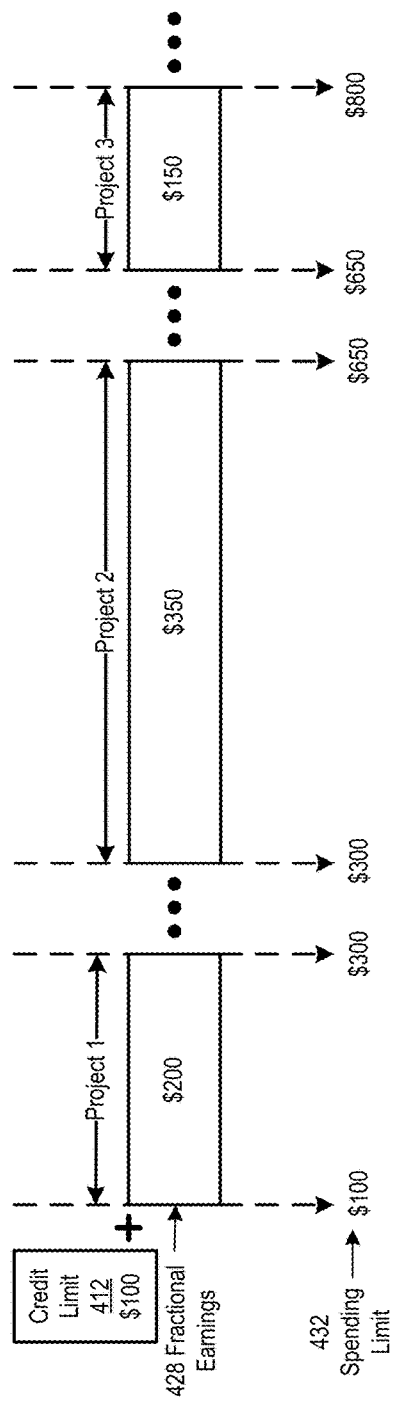
Fig. 8F Credit Example Based on Project Work

Fig. 9 Hourly Credit Example Detail Based on a Two Week Pay Period

Example Parameters
- Credit Limit is $100
- Employee Earns $16/hour
- Taxes/Deductions are 20%
- Accrued Earnings Fraction is 50%

Pay Period 1 528

| | Sat₁ | Sun₁ | Mon₁ | Tue₁ | Wed₁ | Thu₁ | Fri₁ | Sat₂ | Sun₂ | Mon₂ | Tue₂ | Wed₂ | Thu₂ | Fri₂ |
|---|---|---|---|---|---|---|---|---|---|---|---|---|---|---|
| | ←――Work Week 1――→ | | | | | | | ←――Work Week 2――→ | | | | | | |
| 904 Daily Hours Worked | 0 | 0 | 8 | 5 | 10 | 8 | 8 | 10 | 0 | 6 | 7 | 8 | 0 | 8 |
| 504 Daily $ Earned ($16/hour) | $0 | $0 | $128 | $80 | $160 | $128 | $128 | $160 | $0 | $96 | $112 | $128 | $0 | $128 |
| 508 Daily Taxes/Deductions (20%) | $0 | $0 | $26 | $16 | $32 | $26 | $26 | $32 | $0 | $19 | $22 | $26 | $0 | $26 |
| 908 Daily Take Home Pay | $0 | $0 | $102 | $64 | $128 | $102 | $102 | $128 | $0 | $77 | $90 | $102 | $0 | $102 |
| 428 Fractional Earnings (50%) | $0 | $0 | $51 | $32 | $64 | $51 | $51 | $64 | $0 | $38 | $45 | $51 | $0 | $51 |
| 508 Total Accrued Fractional Earnings | $0 | $0 | $51 | $83 | $147 | $198 | $249 | $313 | $313 | $351 | $396 | $447 | $447 | $498 |
| | $0 | $0 | $51 | $83 | $147 | $198 | $249 | $313 | $313 | $351 | $396 | $447 | $447 | $498 |
| 432 Spending Limit | $100 | $100 | $100 | $100 | $100 | $100 | $100 | $100 | $200 | $200 | $200 | $200 | $200 | $200 |
| 416 Purchase Balance | $0 | $0 | $0 | $0 | $0 | $0 | $0 | $0 | $0 | $0 | $0 | $0 | $0 | $0 |
| | $100 | $100 | $100 | $100 | $47 | $98 | $149 | $213 | $113 | $151 | $196 | $247 | $247 | $298 |
| 436 Available Spending Limit | $100 | $100 | $100 | $100 | $47 | $98 | $149 | $213 | $113 | $151 | $196 | $247 | $247 | $298 |

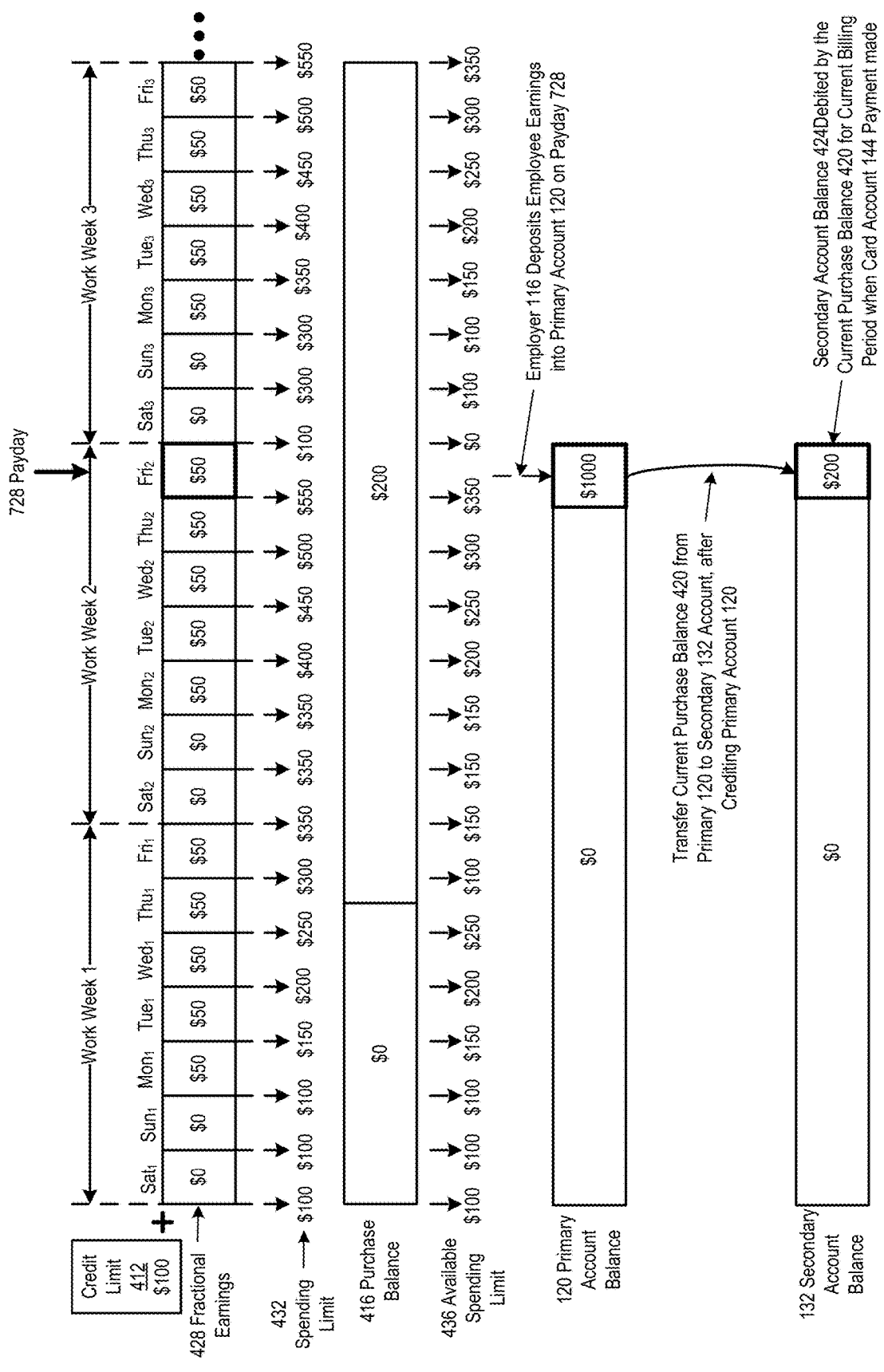
Fig. 10A Credit Example Based on Salaried Earnings

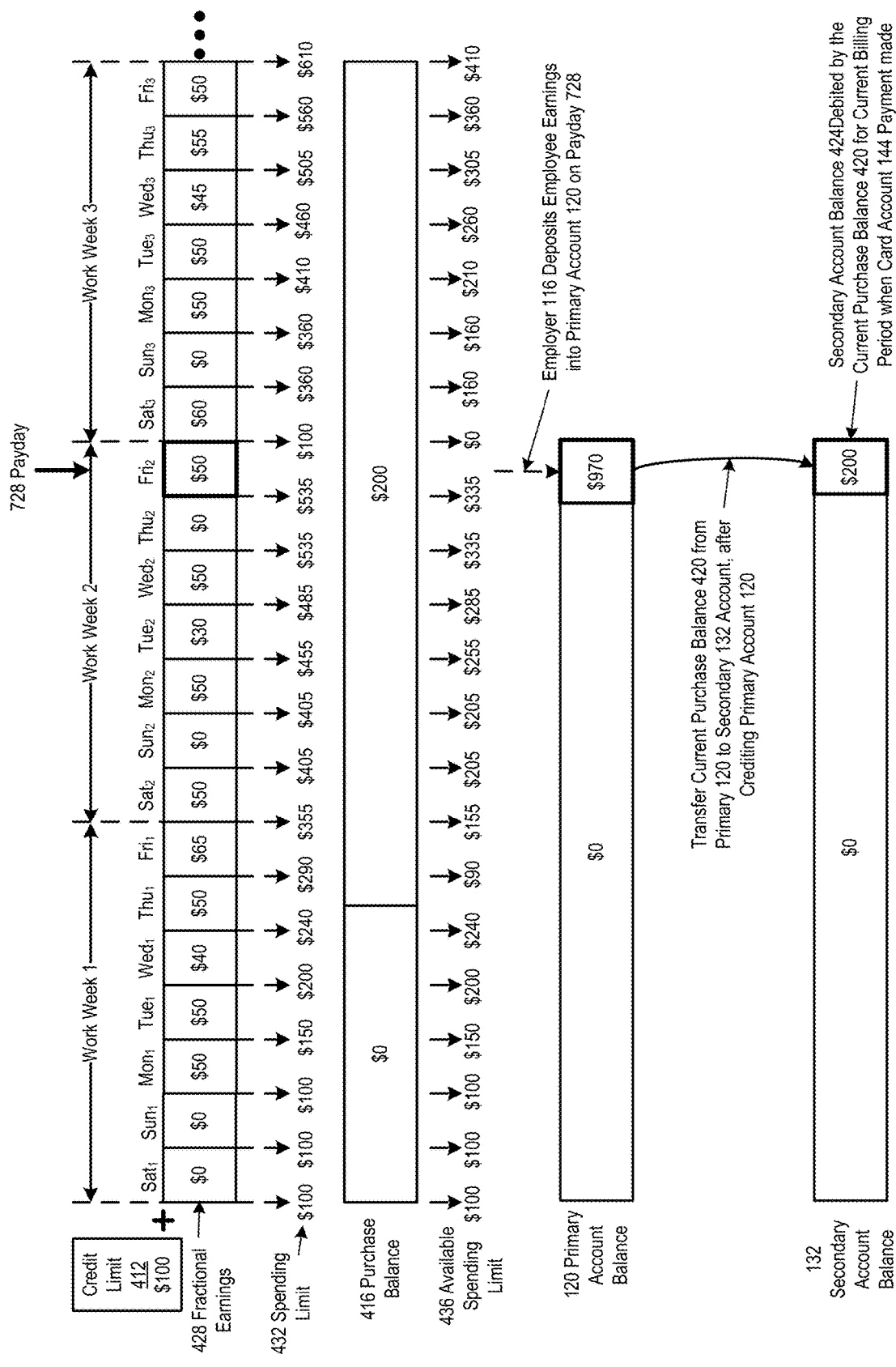

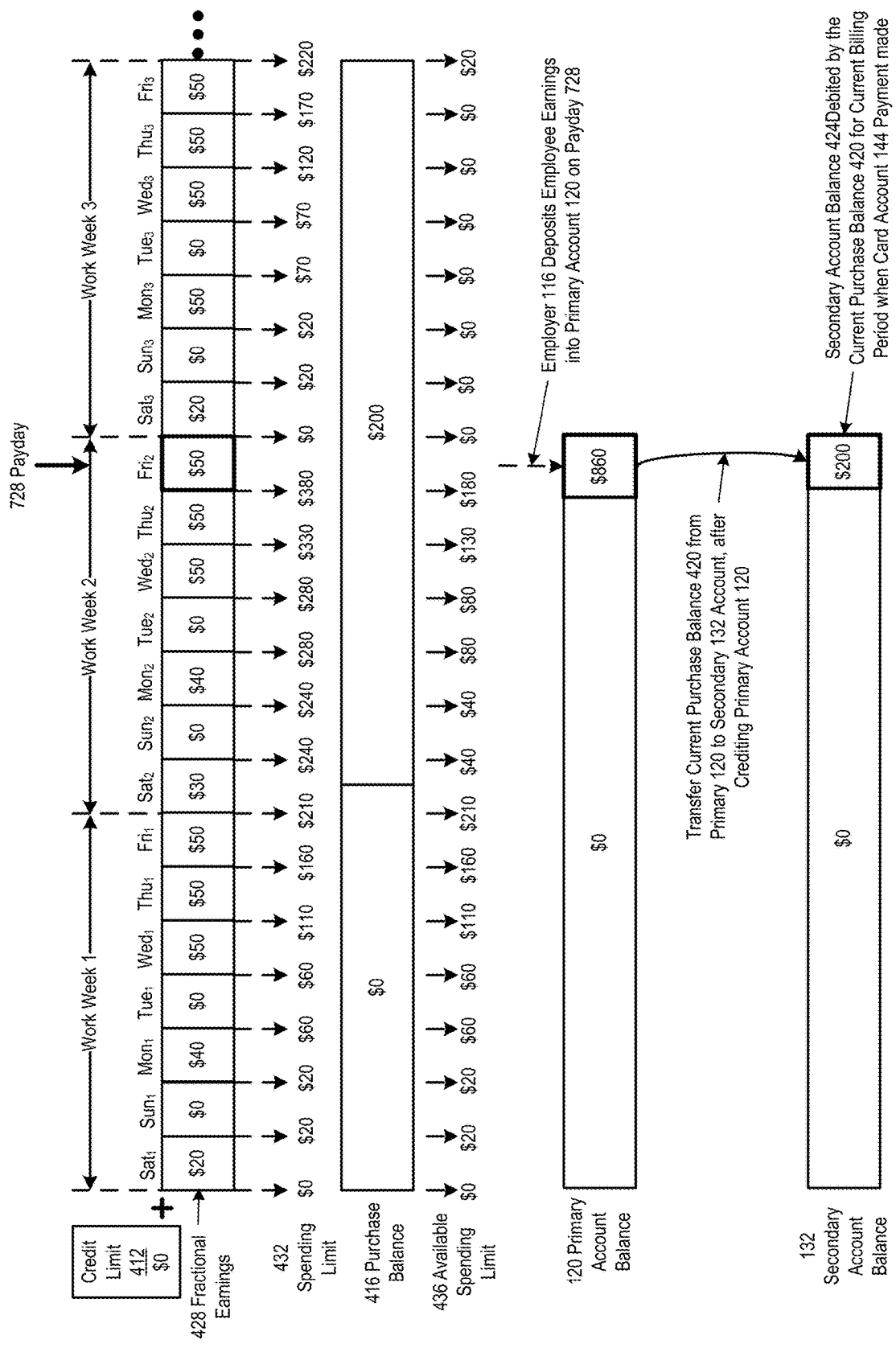
Fig. 10C  Credit Example Based on Hourly Earnings

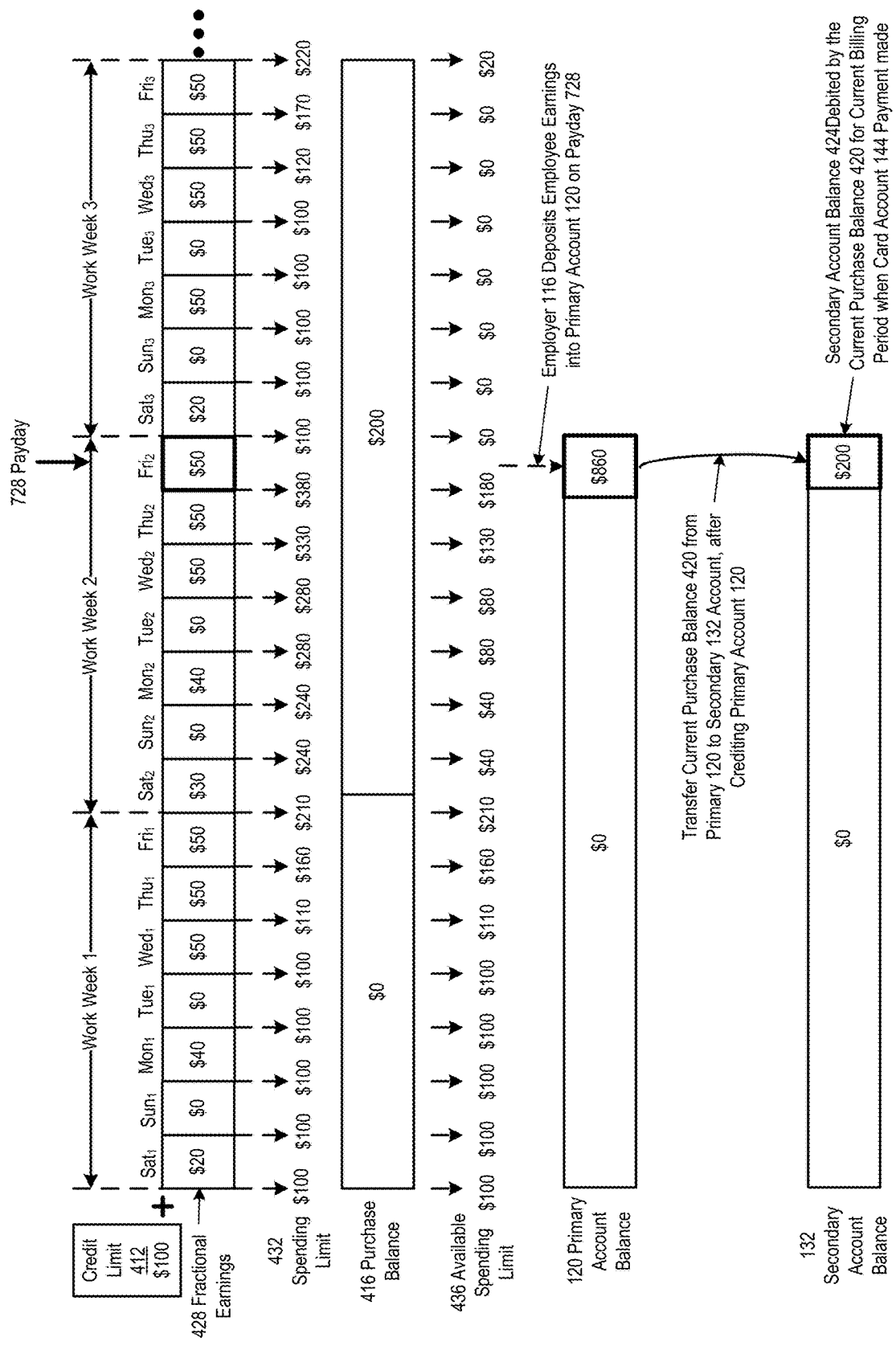
Fig. 10D Credit Example Based on Hourly Earnings

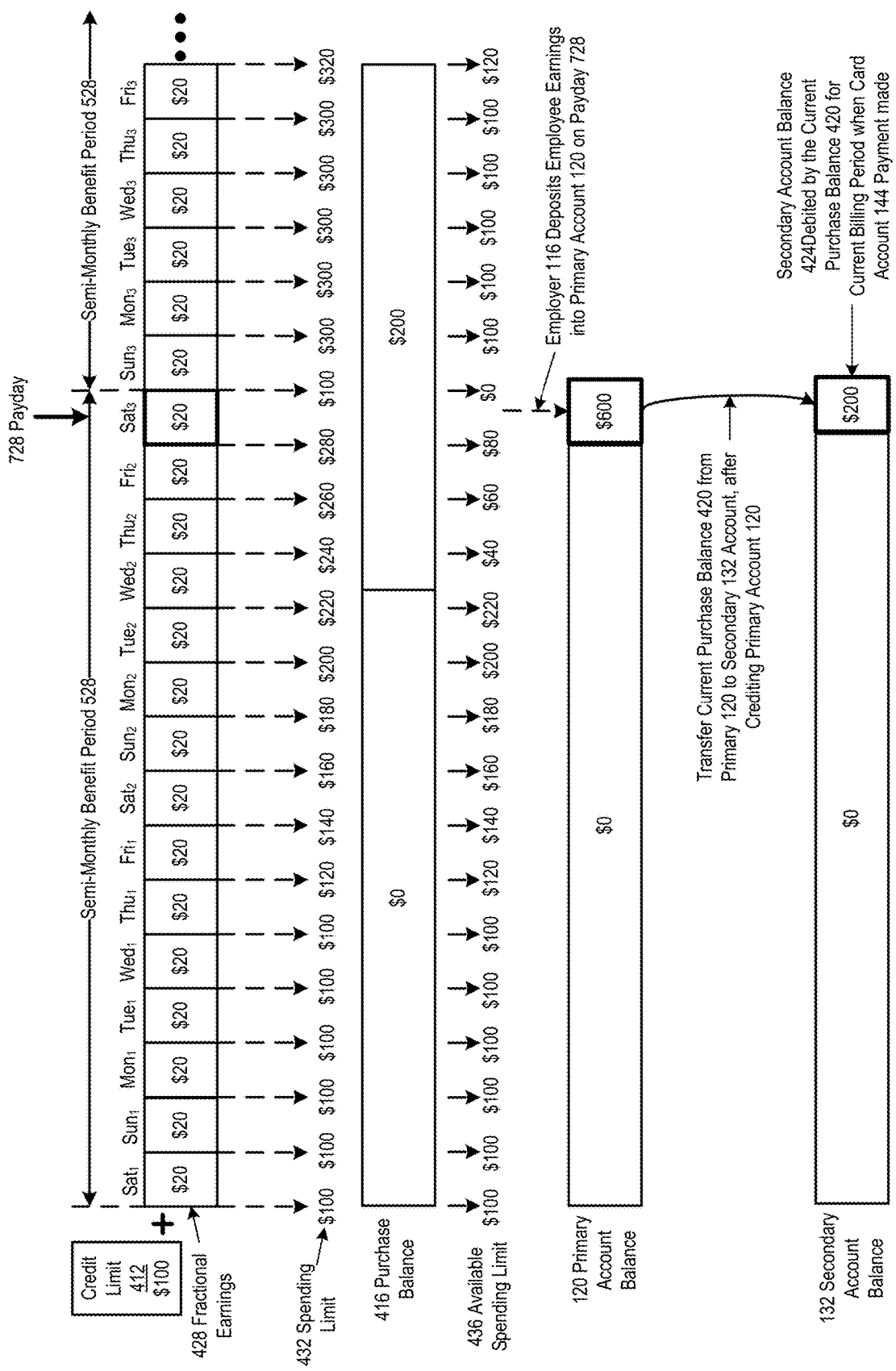
Fig. 10E Credit Example Based on Semi-Monthly Government Benefits

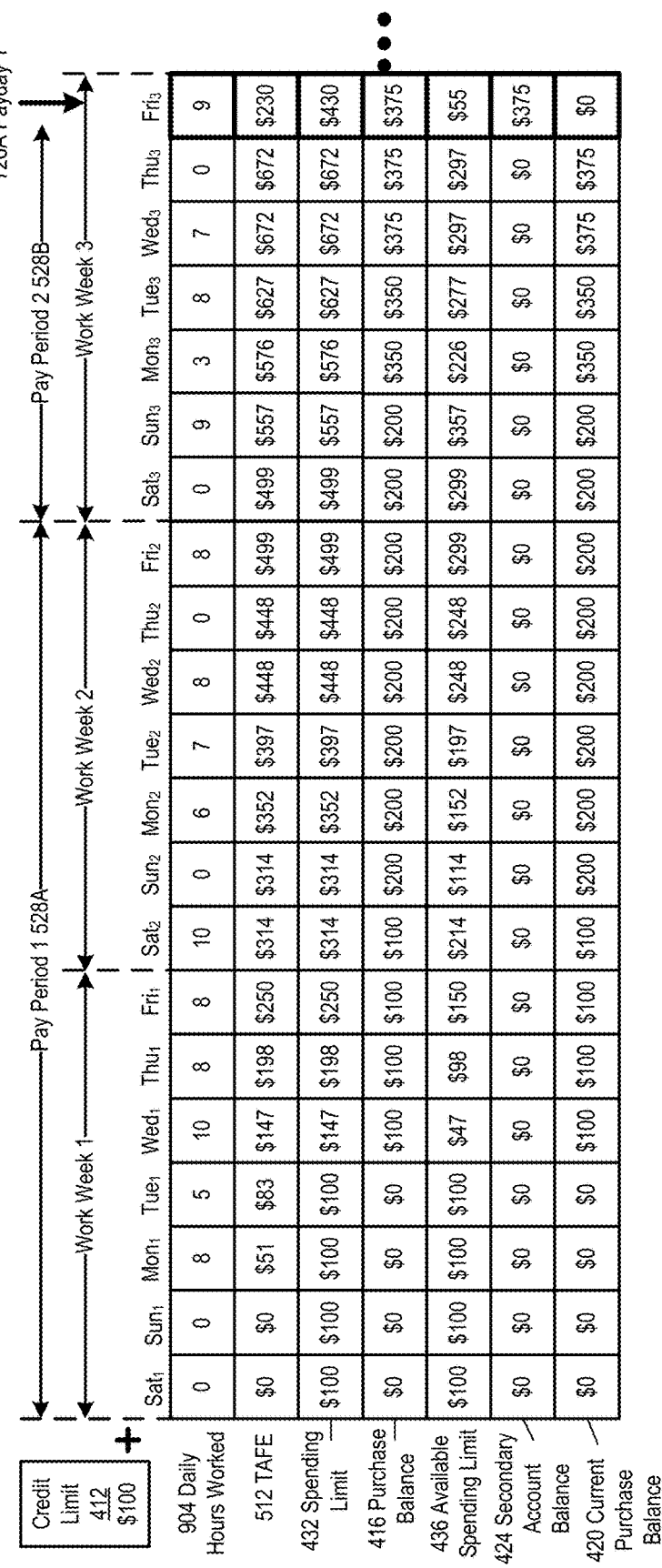
Fig. 11A Credit Example Based on Hourly Payment in Arrears (Work Weeks 1-3)

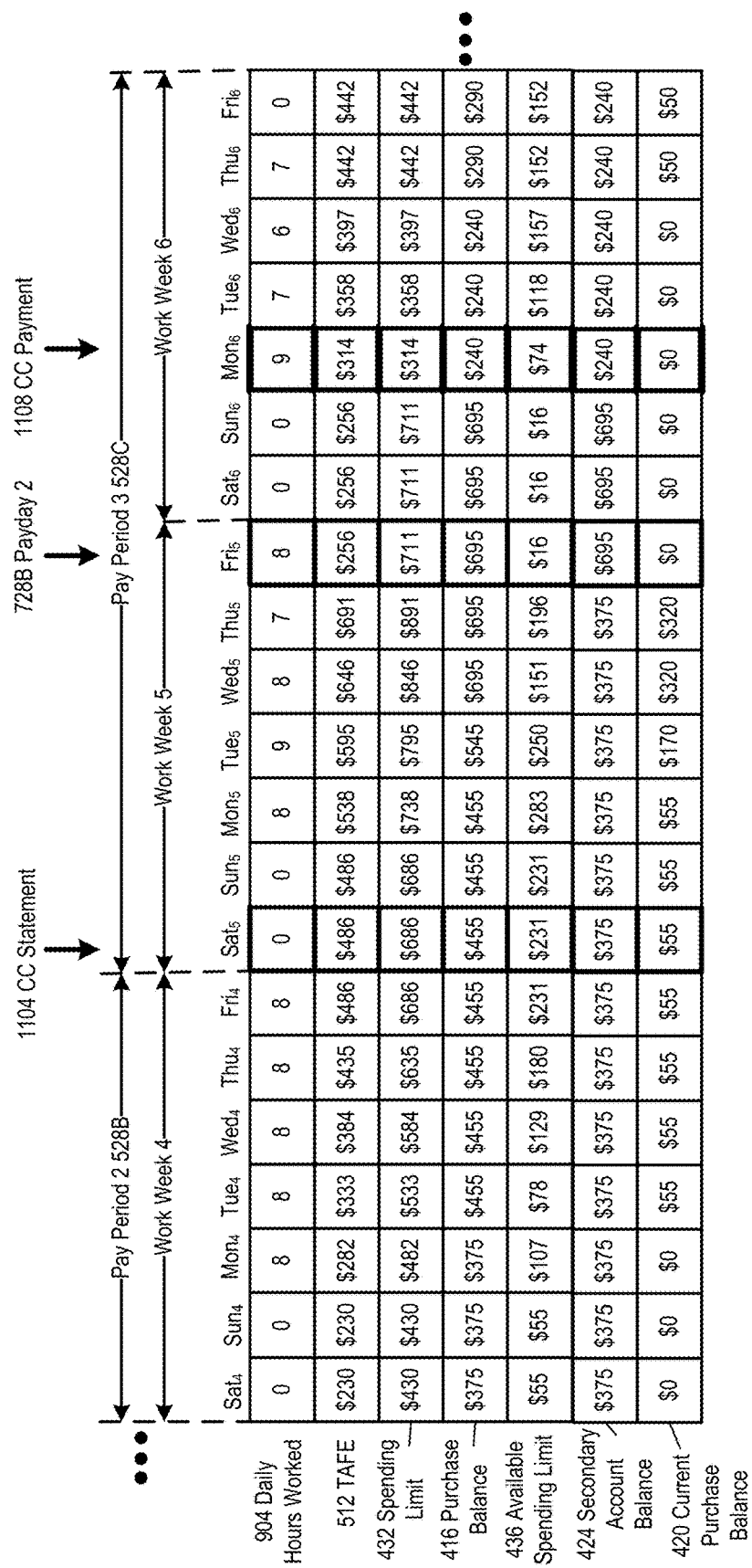
Fig. 11B Credit Example Based on Hourly Payment in Arrears (Work Weeks 4-6)

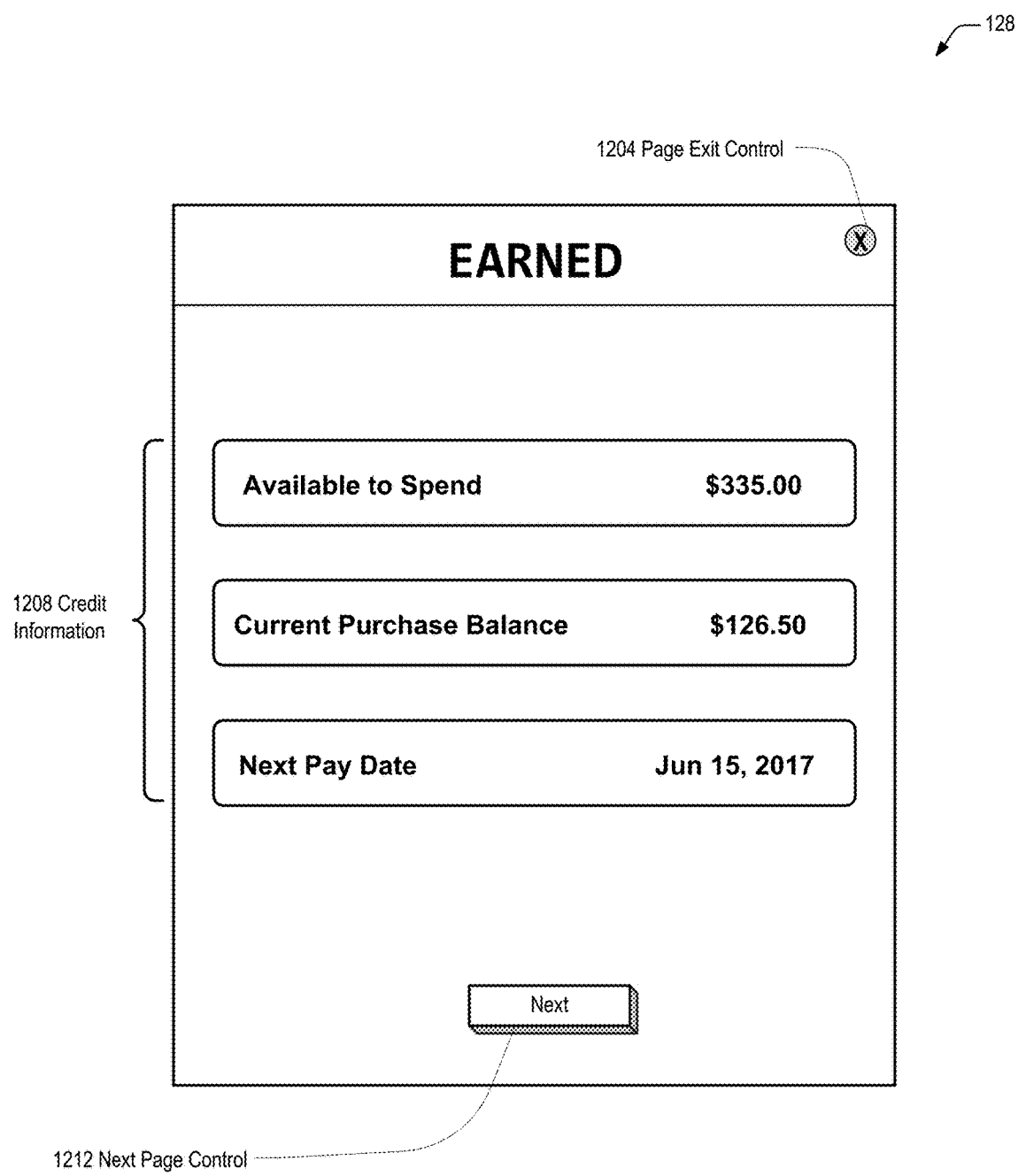
Fig. 12 User Interface Displayed Credit Information

Fig. 13 User Interface Payment Amount Selection Window
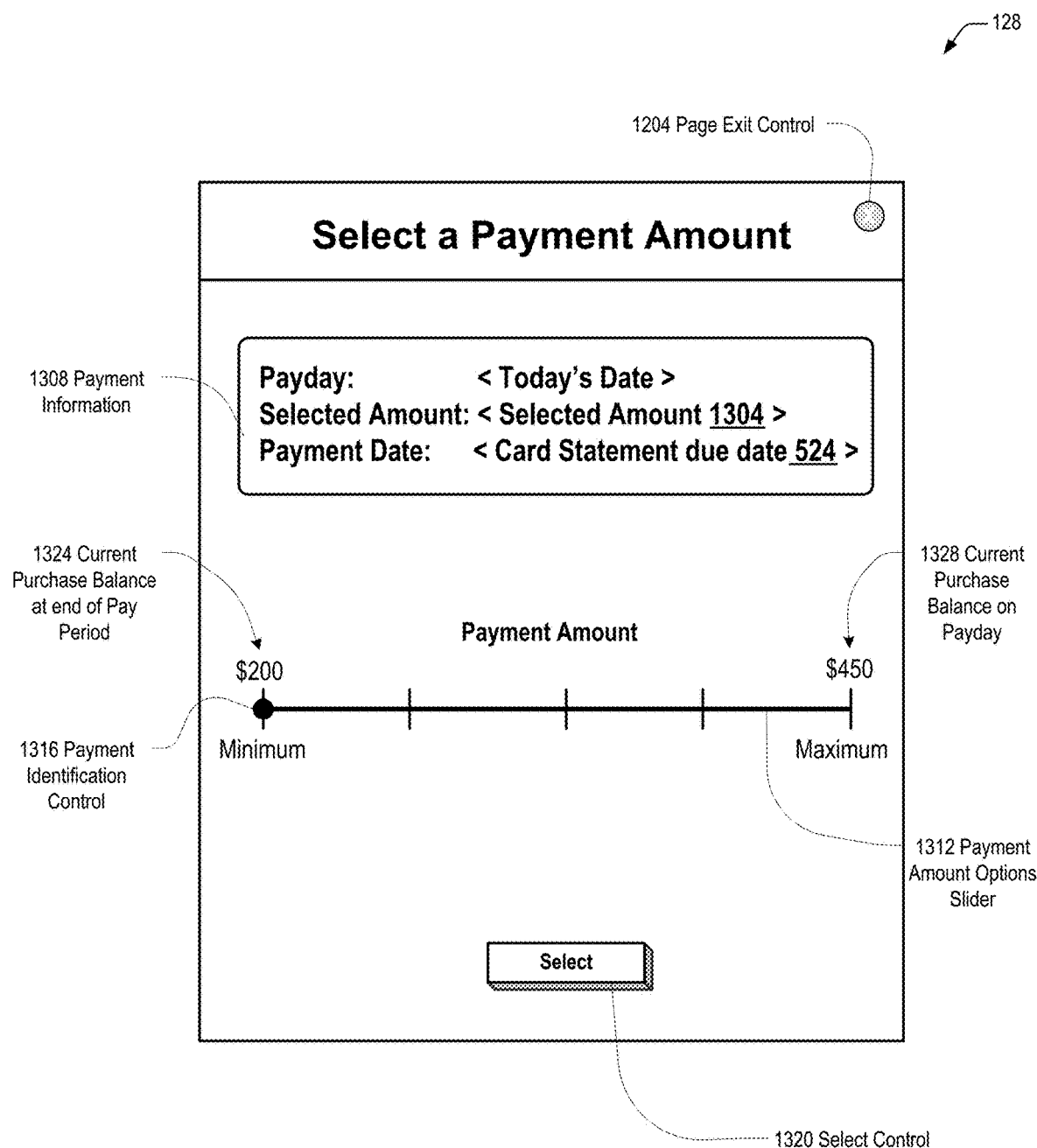

CREDIT MANAGEMENT METHOD AND SYSTEM

CROSS REFERENCE TO RELATED APPLICATIONS

This application claims priority to earlier filed provisional application No. 62/563,321 filed Sep. 26, 2017, entitled "A SYSTEM AND METHOD TO INCREASE FINANCIAL INCLUSION WHEN ISSUING CREDIT CARDS", the entire contents of which are hereby incorporated by reference.

FIELD

The present invention is directed to methods and systems to approve and manage consumer financial cards.

BACKGROUND

Credit cards are a valuable way to make purchases and function in today's world. They are very useful to smooth one's cash flows, and allow easy access to car rentals, booking hotels, and making purchases over the internet. Credit cards also provide protections to the cardholder that are not available to debit card users. When debit cards are used, the funds are withdrawn from a cardholder's checking account on the day of the transaction, while with a credit card there is the financial protection of a built in "layer" associated with transactions. This protection takes the form of a statement which is transmitted to the card holder before they must pay for the transaction. In this way, a customer using a credit card doesn't run the risk of over-drafting their checking account because of unexpected or unaccounted-for debits to their account including fraudulent transactions. Unexpected or unaccounted-for debits to a user's checking account can have a domino effect of financial headaches and can tie up funds, leading to the decline of legitimate charges which cause overdrafts. Another significant benefit of a credit card over a debit card is that the user's payment history is reported to various credit reporting agencies. When properly utilized, credit cards can increase a user's credit score. This benefit can help lower other borrowing costs for a consumer. For instance, if one doesn't have a credit score or has a low credit score and attempts to purchase a car, the interest rate charged will be significantly higher than if one has established a positive credit score by utilizing a credit card. However, in order to obtain a credit card from most banks, one has to have a credit score to begin with or not have a low or "sub-prime" credit score.

While very valuable, an improperly managed credit card can easily saddle consumers with high interest debt, preventing them from using their money in other ways. This is one reason some people use a debit card; to prevent themselves from incurring debt. Many people have a job and have a checking account and utilize a debit card associated with their checking account. When they receive their wages and have money in their checking account, they make purchases with a debit card. This debit card usage is not reported to the credit agencies and the user's credit score does not reflect this usage. What would be better is for the consumer to utilize a credit card and pay their credit card bill when they get paid, without incurring long term debt. However, without a high enough credit score, obtaining a credit card may be difficult.

One reason banks require a "positive" credit score is related to the requirement that credit card users be provided with advance notice before their payment is due. While many people get paid weekly or bi-weekly, banks issuing credit cards are only allowed to bill a customer once a month and they must provide 21 days for the customer to pay their bill before they can accrue interest if their previous bill has been paid in full (unless they don't provide any grace period on interest in the first place and few banks do this).

SUMMARY

The present invention is directed to solving disadvantages of the prior art. In accordance with embodiments of the present invention, a method is provided. The method includes one or more of receiving an application for a card account from a consumer, authorizing the transfer of funds from a primary account to a secondary account, determining an available spending limit for the card account based on total accrued fractional earnings, approving one or more purchase transactions for the card account not greater than the available spending limit, and adjusting the available spending limit based on total accrued fractional earnings, a purchase balance, and the secondary account balance. The primary account stores earnings for the consumer and the secondary account includes a secondary account balance for storing funds to pay a card account statement balance. The primary and secondary accounts include one of separate accounts or a common account. Total accrued fractional earnings include a sum of fractional earnings and fractional earnings include a predetermined fraction of consumer earnings.

In accordance with another embodiment of the present invention, a system is provided. The system includes a network and a merchant device, a secondary account, an employer server, and a banking server, each coupled to the network. The merchant device is configured to perform one or more purchase transactions for a consumer using a card account, and the employer server is configured to transfer consumer earnings to a primary account on a payday, the consumer earnings corresponding to a pay period worked by the consumer. The banking server is configured to approve the one or more purchase transactions not greater than an available spending limit, where the available spending limit based on total accrued fractional earnings. Total accrued fractional earnings include a sum of fractional earnings, and fractional earnings include a predetermined fraction of consumer earnings. In response to the employer server transferring the consumer earnings, the banking server is further configured to transfer an amount include a portion of the purchase balance of the card account from the primary account to the secondary account on or after the payday and transfer up to a card account statement balance from the secondary account to the card account on or before a card statement due date. The primary and secondary accounts include one of separate accounts or a common account.

In accordance with yet another embodiment of the present invention, a non-transitory computer readable storage medium is provided. The non-transitory computer readable storage medium includes one or more of receive an application for a card account from a consumer, authorize transfers from a primary account to a secondary account, determine an available spending limit for the card account based on total accrued fractional earnings, approve one or more purchase transactions for the card account not greater than the available spending limit, and in response to the primary account credited with consumer earnings on a payday, adjust the available spending limit based on total accrued fractional earnings, a purchase balance for the card account, and the secondary account balance. The primary account stores earnings for the consumer. The secondary account includes a secondary account balance for storing funds to pay a card account statement balance. The primary and secondary accounts include one of separate accounts or a common account. Total accrued fractional earnings include a sum of fractional earnings, fractional earnings include a predetermined fraction of consumer earnings.

One advantage of the present invention is that it provides a method for managing credit and cash flow for consumers who are paid hourly, with a salary, or on a consulting or project basis.

Another advantage of the present invention is the new card management system benefits consumers by providing a cash flow smoothing process and will help increase their credit score. Especially for low income or young people making an hourly wage, cash flow must be carefully managed in order to not overdraw bank accounts, not make late payments, and pay bills on time.

Another advantage of the present invention is it provides benefits to merchants by providing increased sales from a large group of consumers who otherwise would not be customers.

Another advantage of the present invention is the ability of a system operator to increase the credit amount available to the consumer based on the income earned by the consumer or money owed to the consumer.

Yet another advantage of the present invention is it allows the consumer to provide input each payday into how much of their available funds are allocated to paying a card statement. This gives greater control and flexibility to consumers.

Additional features and advantages of embodiments of the present invention will become more readily apparent from the following description, particularly when taken together with the accompanying drawings. This overview is provided to introduce a selection of concepts in a simplified form that are further described below in the detailed description. It may be understood that this overview is not intended to identify key features or essential features of the claimed subject matter, nor is it intended to be used to limit the scope of the claimed subject matter.

BRIEF DESCRIPTION OF THE DRAWINGS

FIG. 1 is a diagram illustrating a Data Communication Network in accordance with embodiments of the present invention.

FIG. 2 is a block diagram illustrating a Server in accordance with embodiments of the present invention.

FIG. 3 is a block diagram illustrating a Client Device in accordance with embodiments of the present invention.

FIG. 4 is a diagram illustrating Credit-Related Metadata in accordance with embodiments of the present invention.

FIG. 5A is a diagram illustrating Credit-Related Calculations in accordance with embodiments of the present invention.

FIG. 5B is a diagram illustrating Credit-Related Timing for a Payday in a Payment Period in accordance with embodiments of the present invention.

FIG. 5C is a diagram illustrating Credit-Related Timing for a Payday after a Payment Period in accordance with embodiments of the present invention.

FIG. 6A is a diagram illustrating an Example Calculation of an Accrued Earnings Fraction in accordance with embodiments of the present invention.

FIG. 6B is a diagram illustrating an Example Calculation of an Accrued Earnings Fraction in accordance with embodiments of the present invention.

FIG. 7 is a flowchart illustrating a Transaction Flow Process in accordance with embodiments of the present invention.

FIG. 8A is a diagram illustrating a Credit Example Based on Salaried Earnings in accordance with embodiments of the present invention.

FIG. 8B is a diagram illustrating a Credit Example Based on Hourly Earnings in accordance with embodiments of the present invention.

FIG. 8C is a diagram illustrating a Credit Example Based on Hourly Earnings in accordance with embodiments of the present invention.

FIG. 8D is a diagram illustrating a Credit Example Based on Hourly Earnings in accordance with embodiments of the present invention.

FIG. 8E is a diagram illustrating a Credit Example Based on Semi-Monthly Government Benefits in accordance with embodiments of the present invention.

FIG. 8F is a diagram illustrating a Credit Example Based on Project Work in accordance with embodiments of the present invention.

FIG. 9 is a diagram illustrating an Hourly Credit Example Based on a Two-Week Pay Period in accordance with embodiments of the present invention.

FIG. 10A is a diagram illustrating a Credit Example Based on Salaried Earnings in accordance with embodiments of the present invention.

FIG. 10B is a diagram illustrating a Credit Example Based on Hourly Earnings in accordance with embodiments of the present invention.

FIG. 10C is a diagram illustrating a Credit Example Based on Hourly Earnings in accordance with embodiments of the present invention.

FIG. 10D is a diagram illustrating a Credit Example Based on Hourly Earnings in accordance with embodiments of the present invention.

FIG. 10E is a diagram illustrating a Credit Example Based on Semi-Monthly Government Benefits in accordance with embodiments of the present invention.

FIG. 11A is a diagram illustrating a Credit Example Based on Hourly Payment in Arrears for Work Weeks 1-3 in accordance with embodiments of the present invention.

FIG. 11B is a diagram illustrating a Credit Example Based on Hourly Payment in Arrears for Work Weeks 4-6 in accordance with embodiments of the present invention.

FIG. 12 is a diagram illustrating a User Interface Displayed Credit Information Window in accordance with embodiments of the present invention.

FIG. 13 is a diagram illustrating a User Interface Payment Amount Selection Window in accordance with embodiments of the present invention.

DETAILED DESCRIPTION

Credit cards provide a tremendous benefit to consumers through smoothing of inconsistent cash flows due to payday schedules, permitting delayed payment for purchases, and increasing consumer credit scores. These features, however, are only available to consumers with an acceptable credit rating and an available credit limit on an existing card. Additionally, credit cards typically come with a substantial penalty to the consumer if the credit card provider is not paid in full at the end of the billing cycle. With these standard credit cards, late fees and high interest rate charges can continue to accrue at an alarming rate, thereby placing a tremendous cost on the consumer.

These existing credit cards are not available to a significant portion of consumers, and many consumers with credit cards do not want to use them and potentially incur additional debt. Additionally, for consumers with balances on credit cards, interest is charged from the date of the transaction. These consumers frequently use debit cards, which deduct the transaction amount from a positive balance checking account at the time of the transaction, or at the end of the business day. Debit card customers are unable to make purchases at merchants when their account balances are not positive. For the 76% of the US population that lives paycheck to paycheck and the 47% that cannot make a $400 emergency payment, the time period immediately preceding a payday is one in which they can make no purchases. Employers typically pay their employees weekly or biweekly in arrears, effectively creating a system where employees finance the employer. This system is in place as daily payments are not cost effective as each payment incurs a processing fee, as well as administration time and costs. While businesses use factoring services to finance receivables, employees need a similar service to obtain payment for their services prior to their employers' payroll schedule.

In accordance with the present invention, a new card management system is provided which creates financial inclusion to a group of consumers not currently served by existing systems. What is needed is a more flexible computer-processed payment device, which allows banks to issue cards to consumers with poor or no credit while complying with consumer lending regulations. A more flexible payment device also allows banks to manage variable credit limits for consumers based on pending income and allows consumers to manage their credit balance by setting aside funds on payday to pay their bill in the future.

The present invention meets these needs by providing a credit management system that allows consumers to reserve funds to pay their card bill. Allowing a consumer to manage their cash flow and improve their credit score utilizing a card and a secondary bank account for inter-pay period transactions will increase financial inclusion. Customers can better manage their cash flow and can shift transactions they would have paid via debit card to a credit card, thereby allowing them to improve their credit scores. In the following description, the use of the terms "user" or "consumer" and "merchant" is not intended to limit the scope of the present invention.

Referring now to FIG. 1, a diagram illustrating a Data Communication Network 100 in accordance with embodiments of the present invention is shown. Data communication network 100 includes one or more networks or cloud 112, which provides intercommunication infrastructure between various entities involved with the processes of the present invention. Such networks 112 may include, but are not limited to, wireless telecommunication networks, LANs (Local Area Networks), WANs (Wide Area Networks), WLANs (Wireless LANs), WWANs (Wireless WANs), telecommunication networks, baseband and broadband networks, and so forth. Network 112 may also represent the Internet or one or more cloud networks, possibly including many servers, databases, and other devices.

Network 100 includes one or more merchant devices 108, used by one or more merchants 104 to conduct various purchase transactions. In the preferred embodiment, merchant device 108 is a point of sale (POS) terminal 108, which typically include a computer, a cash register, and other equipment or software used to sell goods or services.

Merchant devices 108 also transmit sales data to be posted to customer accounts. Merchant device or point of sale terminal 108 may include one or more servers with associated databases, and other configurations useful for making purchase transactions.

Network 100 also includes an employer server 116, which manages employee payroll processing and other related tasks. In some embodiments, the employer server 116 is owned by and managed directly by the employer. In other embodiments, employer server 116 is operated or managed by a $3^{rd}$ party including a payroll processor. In some embodiments, employer server 116 is operated by at least one of a person or entity that owes money to the consumer 124. In another embodiment, employer server 116 is operated by at least one of a person or entity which is likely to owe money to the consumer 124. In another embodiment, the employer server 116 is operated by a government entity that pays benefits to the consumer 124. In yet another embodiment, the employer server 116 is a non-government organization that pays benefits to the consumer 124.

Network 100 may also include one or more banking servers 136. Banking servers 136 are operated by banks, other financial institutions, or third party processors connected to various financial networks for processing financial transactions. Banking server 136 sets up and manages card accounts 144 and performs ACH functions: 1) debits the primary account 120 and credits the secondary account 132; 2) debits the secondary account 132 to the issuing bank (i.e. banking server 136); and 3) it determines the spending limit 432 and the available spending limit 436.

Card accounts 144 are accessed via network or cloud 112, and may be credit card accounts, debit card accounts, or hybrid card accounts (i.e. having both credit and debit properties), and the card may be a credit card, debit card, or a hybrid card. In one embodiment, the card account includes the secondary account 132. Banking server 136 accesses database 140 to access various financial accounts related to consumer 124. For example, third party databases can contain information relating to the financial history of the consumer 124 or other information about the consumer 124 that may be used in scoring or otherwise determining when and in what amounts to approve transactions for consumer 124. Funds transfer instructions may be transmitted from database 140 to issuing bank 136, secondary account 132 bank, and primary account 120 bank, or any other financial intermediary.

Network 100 also includes one or more client devices 128 for employee or consumer 124. Consumer 124 is employed by the employer corresponding to employer server 116, and may be an hourly employee, salaried employee, a contractor (performing work on a project or other basis), or someone receiving government benefits and not necessarily employed by the employer corresponding to employer server 116. In the case of a consumer 124 receiving government benefits, the employer server 116 is operated by a government entity or third party processor and the actions associated with the employer are instead performed by the government entity or third party processor. Client device 128 is any type of computing device suitable for communicating with network or cloud 112 and the other elements of network 100, and is described in more detail with respect to FIGS. 3, 12, and 13. Client device 128 includes but is not limited to personal computers (PCs), handheld PCs, laptops, tablets, personal data assistants (PDA), mobile telephones, smartphones, smart accessories (e.g., a smartwatch, GOOGLE glasses, etc.), mobile internet devices, computer chip biological implants, and so forth.

Associated with the employee or consumer 124 is a primary account 120, which stores consumer 124 earnings. The primary account 120 is typically a checking account at a bank, credit union, savings and loan, or other financial institution. The financial institution associated with the banking server 136 stores consumer information, including information about at least one financial account. Various other items of information, including but not limited to consumer name, consumer address, employer, ID number and phone number may also be stored in system database 140. In one embodiment, system database 140 may be partitioned and may be located across multiple physical locations; furthermore, a system may include more than one system database 140, and such databases would work cooperatively. For example, information pertaining to card transactions may be retrieved from a system database 140 operated by an issuing bank while instructions for payment processing may be stored on a remote system database that is not operated by the issuing bank.

Also associated with the consumer 124 is a secondary account 132, which is typically a checking account at a bank, credit union, savings and loan, or other financial institution. The secondary account 132 stores funds used to pay a card account statement balance due 516, and funds are transferred from the primary account 120 to the secondary account 132 on one or more paydays 728. In one embodiment, the financial institution controlling the primary account 120 is different from the financial institution controlling the secondary account 132. In another embodiment, the financial institution controlling the primary account 120 is the same as the financial institution controlling the secondary account 132. In another embodiment, the primary account 120 is separate from the secondary account 132. In another embodiment, the primary account 120 is the same account as the secondary account 132. In another embodiment, the secondary account 132 is separate from a card account 144 (i.e. the account receiving payment for the card account statement balance due 516). In yet another embodiment, the secondary account 132 is the same account as the card account 144.

In an additional embodiment, banking server 136 and/or system database 140 can also make use of data received from third party databases (not shown). In various embodiments, third party databases may contain information relating to the financial history of the consumer 124 or other information about the consumer 124 that may be used in scoring or otherwise determining when and in what amounts to approve transactions for consumer 124. Funds transfer instructions may be transmitted from the system database 140 to an issuing bank, secondary account 132 bank, primary account 120 bank, or any other financial intermediary.

Referring now to FIG. 2, a block diagram illustrating a server 136 in accordance with embodiments of the present invention is shown. Any of merchant device 108, employer server 116, or banking server 136 may be considered "servers" as described herein, although there are countless valid architectures and arrangements for suitable computing devices that may act as servers, most of which are not specifically represented herein.

Servers 108, 116, 136 includes one or more processors 204 and memory 208. The processor 204 may be any type of processors, including but not limited to X86 processors, RISC processors, Field Programmable Gate Arrays (FPGAs), Application Specific Integrated Circuits (ASICs), or any other form of central processing unit (CPU) that fetches and executes instructions and data from memory 208. The instructions may include the server 108, 116, 136 operating system, one or more applications 216 of the present invention, and third-party applications. The memory 208 may include various forms of metadata 212 as described in FIG. 4 and elsewhere including information obtained from any of database 140 as well as third party databases. Memory 208 includes both volatile and nonvolatile memories known in the art, and may include one or more portable memory devices including flash memory, USB sticks, SD cards, or the like.

Servers 108, 116, 136 also includes one or more network interfaces 228 to interface to network or cloud 112. In some embodiments, the connection to network or cloud 112 is over standard Ethernet or other IP-based cabling. In other embodiments, the connection to network or cloud 112 is over radio frequency (RF) connections such as Wi-Fi, Bluetooth, or other radio access technologies including but not limited to 4G/5G and LTE.

Servers 108, 116, 136 may include a visual display 224. The visual display 224 provides a user display for all video, text, and graphical annotation information used by a server 108, 116, 136 operator, possibly including merchant 104. The display 224 may also include a touch screen manipulated using a finger or stylus-activated pointing device.

Finally, servers 108, 116, 136 may also include a keyboard 220 of some type. In some embodiments, the keyboard 220 is a hardware alphanumeric keyboard provided as part of, or attached to server 108, 116, 136. In other embodiments, the keyboard 220 may be graphically displayed on the display 224, and key selection is performed either by finger or stylus contact.

Referring now to FIG. 3, a block diagram illustrating a client device 128 in accordance with embodiments of the present invention is shown. Client device 128 may be architecturally similar to server 108, 116, 136, although in many modern embodiments a consumer is more likely to use a portable computer of some sort (i.e. smartphone, pad device, wearable computer, etc) and/or a desktop computer.

Client device 128 includes one or more processors 304 and memory 308. The processor 304 may be any type of processor, including but not limited to X86 processors, RISC processors, Field Programmable Gate Arrays (FPGAs), Application Specific Integrated Circuits (ASICs), or any other form of central processing unit (CPU) that fetches and executes instructions and data from memory 308. The instructions may include the client device 128 operating system, one or more applications 316 of the present invention, and third-party applications. The memory 308 may include various forms of metadata 312. Memory 308 includes both volatile and nonvolatile memories known in the art, and may include one or more portable memory devices including flash memory, USB sticks, SD cards, or the like.

Client device 128 also includes one or more network interfaces 328 to interface to network or cloud 112. In some embodiments, the connection to network or cloud 112 is over standard Ethernet or other IP-based cabling. In other embodiments, the connection to network or cloud 112 is over radio frequency (RF) connections such as Wi-Fi, Bluetooth, or other radio access technologies including but not limited to 4G/5G and LTE.

Client device 128 may include a display screen 324. The display screen 324 provides a user display for all video, text, and graphical annotation information used by a consumer or user 124. The display screen 324 may also include a touch screen allowing finger or stylus activated controls as part of user interface controls (UI controls) 320, which generate a selected control 332 as described herein and with specific reference to FIGS. 12 and 13.

In some embodiments, client device 128 includes a GPS receiver 336 that produces GPS coordinates 340 used for tracking the location of the client device 128. This may be used, for example, in tracking a location for an employee 124 in order to accumulate work hours at a designated work location.

Referring now to FIG. 4, a diagram illustrating Credit-related Metadata 212 used to manage credit parameters in accordance with embodiments of the present invention is shown. Parameters 212 in some embodiments are stored in metadata 212 of one or more of servers 108, 116, and 136, although it should be understood than any required parameters and data of the present invention may also be retrieved from database 140, or $3^{rd}$ party databases.

Parameters 212 include data for at least user or consumer 124, but may include data for any number N of users or consumers 124. The parameters 212 may include an accrued earnings fraction 408, a credit limit 412, a purchase balance 416, a current purchase balance 420, a secondary account balance 424, fractional earnings 428, a spending limit 432, and an available spending limit 436. Parameters 212 are not limited to only the categories shown, and may include other parameters useful for performing the processes of the present invention.

Referring now to FIG. 5A, a diagram illustrating Credit-Related Calculations in accordance with embodiments of the present invention is shown. The credit-related calculations are part of one or more applications 216 of one or more servers 108, 116, 136, as shown in FIG. 1. Many of the calculations shown in FIG. 5A are exemplary in nature and/or reflective of a common or preferred embodiment. The illustrated calculations perform the primary processes of the present invention.

The present application describes a novel method, system, and computer-readable storage medium that dynamically and continuously calculates consumer credit based on fractional earnings 428. A consumer 124 may accrue, or accumulate, fractional earnings 428 on a regular or non-regular basis. For example, an hourly employee may accrue earnings each day, each hour, each minute, or any other conceivable time measurement. Although a salaried employee 124 is generally paid on an annual or sometimes monthly salary, such a salary may be reduced to a weekly, daily, semi-monthly, by the minute, or any other time basis. A consumer 124 receiving government benefits may be paid every few weeks, semi-monthly, or monthly, on a regular basis. A consumer 124 performing project work may be paid at the conclusion of a project, or sometimes monthly or at regular intervals prior to the project end. In the preferred embodiment, fractional earnings 428 are calculated daily for hourly and salaried employees and those receiving government benefits.

For a salaried employee 124, fractional earnings 428 are equal to an accrued earnings fraction 408 multiplied by daily earnings 504. Thus, for a salaried employee 124 having daily earnings 504 of $100 and an accrued earnings fraction 408 of 50% or 0.5, the fractional earnings 428 for each day worked would be $100*0.5=$50. Daily earnings 504 for a salaried employee 124 will be constant for each day worked.

For an hourly employee 124, fractional earnings 428 are equal to an accrued earnings fraction 428 multiplied by daily earnings 504. Therefore, for an hourly employee 124 making $15/hour and working an 8 hour day, the daily earnings 504 for that day would be $120 ($15×8). If the accrued earnings fraction is 50% or 0.5, the fractional earnings 428 for that day would be $120*0.5=$60. Daily earnings 504 for an hourly employee 124 will vary, based on the number of hours worked.

Total accrued fractional earnings 512 are equal to a sum of fractional earnings 428 for which a consumer 124 has not yet been paid. Therefore, fractional earnings 428 that a consumer 124 has been paid for are not included in total accrued fractional earnings 512. Total accrued fractional earnings 512 are a key parameter that is tracked and calculated for each employee or consumer 124.

When a consumer or employee 124 applies for credit, one of the items that is calculated is a credit limit 412. Many methods known in the financial products industry may be used to calculate a credit limit 412, and may include a credit rating, a payment history, an earnings history, a purchase history, or any other factors deemed to be relevant by the issuing credit provider. In some embodiments, an initially-assigned or initial credit limit 412 is zero. In other embodiments, a credit limit 412 is a non-zero value. In some embodiments, a credit limit 412 may increase, decrease, or fluctuate over time.

A spending limit 432 is maintained for each employee or consumer 124. In one embodiment, a spending limit 432 is equal to a credit limit 412+total accrued fractional earnings 512+the secondary account balance 424. In another embodiment, a spending limit 432 is equal to a credit limit 412+(total accrued fractional earnings 512 greater than the credit limit 412)+the secondary account balance 424. In yet other embodiments, a different calculation may be used for the spending limit 432. The spending limit 432 calculation may change over time, and new or different factors may be added or subtracted from the calculation. Different employees or consumers 124 may have different spending limit 432 calculations. The specific calculation used depends on the objectives of the credit provider, reliability of the employee or consumer 124, and many other potential factors.

A purchase balance 416 is also maintained for each employee or consumer 124. The purchase balance 416 is equal to a sum of all purchases made to date by the employee or consumer 124 (using the same card) that have not been paid for. Therefore, the purchase balance 416 will increase as purchase transactions are approved by the banking server 136, and will decrease as payments are made to a card account 144. A current purchase balance 420 is equal to the purchase balance 416 minus the secondary account balance 424. The secondary account 132 stores funds used to pay the card account 144 on or before a card statement due date 524. Therefore, the current purchase balance 420 increases as the purchase balance 416 increases, and decreases as the purchase balance 416 decreases or funds are transferred from the primary account 120 to the secondary account 132.

The employee or consumer 124 is notified of a current maximum amount they can purchase, as described with reference to FIGS. 12 and 13. This maximum amount is called the available spending limit 436, and is equal to the spending limit 432−the purchase balance 416. Therefore, the available spending limit 436 increases as the spending limit 432 increases, and decreases as the spending limit 432 or purchase balance 416 decreases.

A card account statement balance due 516 is also maintained for each employee or consumer 124. The card account statement balance due 516 is equal to the purchase balance 416 for the card statement period 520, and an amount up to the card account statement balance due 516 is paid on or before the card statement due date 524. By paying the card account balance due 516 on or before the card statement due date 524, the credit rating for the employee or consumer 124 is beneficially increased.

As previously described, each payday 728 a certain amount of funds are transferred from the primary account 120 to the secondary account 132. The funds in the primary account 120 are provided by an employer or government entity based on wages earned by the employee or consumer 124. The funds in the secondary account 132 are used to pay the card account statement balance due 516. In one embodiment, a lesser of the current purchase balance 420 on the payday 728 and the total accrued fractional earnings 512 on the last day of the previous pay period (corresponding to the payday 728) are transferred from the primary account 120 to the secondary account 132 on the payday 728. In another embodiment, the employee or consumer 124 is presented the current purchase balance 420 (see FIG. 13) and selects how much to allocate from the primary 120 to the secondary 132 account. The minimum amount is the current purchase balance 420 at the end of the most recent pay period (corresponding to the payday 728). The maximum amount is the current purchase balance 420 on the payday 728. The selected amount is then transferred from the primary account 120 to the secondary account 132 on the payday 728. Although two different embodiments are shown and described, it should be understood that many such calculations and alternative methods may be employed for calculating the transfer amount from the primary account 120 to the secondary account 132 without deviating from the scope and intent of the present application.

Referring now to FIG. 5B, a diagram illustrating Credit-Related Timing for a Payday in a Payment Period 528 in accordance with embodiments of the present invention is shown. Salaried and hourly employees or consumers 124 are generally paid on a regular basis, such as weekly, biweekly, semi-monthly, or monthly. The date the employee or consumer 124 is paid is referred to as the payday 728. On the payday 728, the employee or consumer 124 receives a check or funds are paid to a primary account 120, which is usually a checking account or debit card for the employee or consumer 124. In the embodiment illustrated in FIG. 5B, the payday 728 occurs on the last day of each pay period 528. On each payday 728, not only are employer funds deposited into the employee or consumer's primary account 120, but after those funds have been deposited, a portion of the funds in the primary account 120 are transferred to the secondary account 132. The various pay periods 528 overlap with a card statement period 520. In most embodiments, the card statement period 520 is 1 month in duration, and ends in a card statement due date 524 on which a payment to the card account 144 should be made. The card statement period 520 may or may not coincide with a pay period 528 boundary or a payday 728.

Referring now to FIG. 5C, a diagram illustrating Credit-Related Timing for a Payday 728 after a Payment Period 528 in accordance with embodiments of the present invention is shown. Salaried and hourly employees or consumers 124 are generally paid on a regular basis, such as weekly, biweekly, semi-monthly, or monthly. In the embodiment illustrated in FIG. 5C, the payday 728 occurs after the last day of each pay period 528. In the illustrated embodiment, paydays 728 occur in the middle of a following pay period 528, and reflects payment for the last previously completed pay period 528. This is sometimes referred to as payment in arrears. On each payday 728, not only are employer funds deposited into the employee or consumer's primary account 120, but after those funds have been deposited in the primary account 120, a portion of the funds in the primary account 120 are transferred to the secondary account 132. The various pay periods 528 overlap with a card statement period 520. In most embodiments, the card statement period 520 is 1 month in duration, and ends in a card statement due date 524 on which a payment to the card account 144 should be made. The card statement period 520 may or may not coincide with a pay period 528 boundary or a payday 728.

Referring now to FIG. 6A, a diagram illustrating an Example Calculation of an Accrued Earnings Fraction 408 in accordance with embodiments of the present invention is shown. FIG. 6A provides a concrete example of a possible calculation for an accrued earnings fraction 408, which is a predetermined fraction of consumer earnings used to calculate fractional earnings 428 as shown in more detail in FIG. 9. The accrued earnings fraction 408 calculation may remain the same for a given employee or consumer 124, or change in some way during the time in which the employee or consumer 124 has approved credit privileges. Although establishing an accrued earnings fraction 408 is part of configuring the process of the present application after approving a credit application, the process may possibly be repeated with different calculations at other times, and/or may be recalculated periodically.

The accrued earnings fraction 408 in one embodiment is equal to a 3 month rolling average of earnings for the consumer 124—financial obligations, divided by the 3 month rolling average of earnings. Financial obligations include regular payments for other purposes the employee or consumer 124 is required to make. For example, financial obligations may include a rent payment, a house payment, a car payment, a student loan payment, or any form of regular payment the employee or consumer 124 is required to pay. The 3 month rolling average of earnings is equal to a 3 month rolling average of hours worked times an hourly wage (for an hourly employee 124, for example).

Referring now to FIG. 6B, a diagram illustrating an Example Calculation of an Accrued Earnings Fraction 408 in accordance with embodiments of the present invention is shown. FIG. 6B utilizes the calculations shown in FIG. 6A with supplied data to obtain a potential real-world example. For the illustrated example, assume that a worker or employee 124 works 140 hours for a $1^{st}$ month, 150 hours for a $2^{nd}$ month, and 155 hours for a $3^{rd}$ month, and the worker earns $15/hour. Also assume that a rent payment for the worker is $1000/month, a car payment is $500/month, and a student loan payment is $200/month.

The 3 month rolling average of hours worked would be (140+150+155)/3 hours or 455/3 hours or 148.33 hours. The 3 month rolling average of earnings would be 148.33 hours×$15/hour=$2,225. The financial obligations would total $1000+$500+$200=$1,700/month. Therefore, the accrued earnings fraction 408=($2,225−$1,700)/$2,225 or $525/$2,225 or 0.236 (23.6%). This example provides only one such example calculation of many such potential calculations. The objective of the calculation is to establish a basis for accruing credit such that a meaningful level of credit is available for purchases of goods or services, without allowing the employee or consumer 124 to overextend themselves and have insufficient cash for customary and usual non-credit expenses.

Referring now to FIG. 7, a flowchart illustrating a Transaction Flow Process in accordance with embodiments of the present invention is shown. Flow begins at block 704.

At block 704, the banking server 136 approves a consumer card account 144 for a consumer 124. The consumer 124 has previously completed a consumer card application and submitted the application to the card provider. In one embodiment, the consumer 124 provides information for the application including at least one of name, address, social security number, date of birth, income, employer, occupation, mortgage payment, rent payment, and the like. In an additional embodiment, the consumer information includes at least one financial account at a primary account 120 bank. Flow proceeds to block 708.

At block 708, the consumer 124 and the banking server 136 configure primary 120 and secondary 132 accounts. The banking server 136 receives authorization from the consumer 124 to transfer funds from the primary account 120 at a primary account bank to a secondary account 132 at a secondary account bank. In an additional embodiment, the banking server 136 receives a consumer agreement to initiate funds transfers from a primary account 120 at the primary account bank to a secondary account 132 at the secondary account bank. In an additional embodiment the banking server 136 receives authorization from consumer 124 to transfer funds from the secondary account 132 at the secondary account 132 bank. In some embodiments, configuring the secondary account 132 includes opening an account for the consumer 124 at the secondary account 132 bank. In one embodiment, the banking server 136 receives from consumer 124 the required application information for the secondary account 132 bank concurrently with the application for the card. In an additional embodiment, the system receives such required application information subsequent to the card application. In an additional embodiment, consumer 124 provides such required application information directly to the secondary account 132 bank.

In some embodiments, the primary 120 and secondary 132 accounts are separate accounts, while in other embodiments they are the same account. In most embodiments, the primary account 120 is at the consumer's bank, and may be a regular checking account. The secondary account 132 may be at the consumer's bank, or a different financial institution, including a bank used by the card provider. As part of configuring the primary 120 and secondary 132 accounts, the primary 120 account is configured to transfer a predetermined amount of funds to the secondary 132 account, and the banking server 136 is configured to adjust the available spending limit 436, as described herein. Flow proceeds to block 712.

At block 712, the banking server 136 sets a credit limit 412. In one embodiment, consumer 124 is approved for a minimal credit limit 412 on the card. In one embodiment, the credit limit 412 is increased by the actual value of pending income. The credit limit 412 includes an initial credit amount to be offered to the consumer 124 which is used in calculations of a spending limit 432. In one embodiment, the credit limit 412 is equal to zero or there is no credit limit 412 set. In other embodiments, the credit limit 412 is a positive dollar amount. The credit limit 412 may be based on many factors, including credit history, a previous credit limit, a purchase history, a payment history, or many other factors. In one embodiment, the consumer 124 is provided with a virtual card number and a physical card is mailed to the consumer 124. In an additional embodiment, the virtual card is the sole payment device. In an additional embodiment, the physical card is the sole payment device. Flow proceeds to block 716.

At block 716, the banking server 136 determines an accrued earnings fraction 408. The accrued earnings fraction 408 was described in more detail in FIGS. 6A and 6B, and is used to calculate fractional earnings 428. In some embodiments, the accrued earnings fraction 408 is always a fixed percent. In other embodiments, the accrued earnings fraction 408 may change based on changes in an employee's wages, spending patterns, savings patterns, credit history, and payment history. Flow proceeds to block 720.

At block 720, the available spending limit 436 is initially calculated. The available spending limit 436 is equal to the spending limit 432 minus the purchase balance 416. If no purchases have been made, then the available spending limit 436 is the same as the spending limit 432. Flow proceeds to blocks 724, 728, and 736.

At block 724, the banking server 136 or merchant device 108 processes or declines transaction requests for card purchases, based on the available spending limit 436. For example, if the purchase transaction amount exceeds the available spending limit 436, the purchase transaction would be declined. If instead the purchase transaction amount is the same or less than the available spending limit 436, the purchase transaction would be approved. As would be appreciated, access to a card account to verify the credit limit 412 could be achieved by any method including: an internet browser; phone call; text message, or an application 316 on at least one of a mobile device, tablet, personal computer, and the like. Flow proceeds to block 744.

At block 728, the consumer 124 is paid on a payday 728. In various embodiments, the consumer 124 is paid via at least one of: a time when funds are available in a primary account 120 at a primary account 120 bank, at a time when funds are expected to be available in the primary account 120, and a time when consumer 124 has access to funds that are owed to him/her. In one embodiment, the transfer takes place on the same day as consumer 124 is paid. In another embodiment, the transfer takes place on a day subsequent to the day that consumer 124 is paid. In one embodiment, the banking server 136 collects pay information from the consumer 124 via means of at least one of the following but not limited to: manual entry, a mobile application, electronic notification from the employer, electronic notification from a time clock service provider, electronic notification from a payroll service provider, electronic notification from the primary account 120 bank, and the like. In an additional embodiment, banking server 136 collects pay information by electronically pulling data from at least one of an employer, a time clock service provider, a payroll service provider, the primary account 120 bank, and the like. In one embodiment, the mobile application calculates pay information using the time spent at a known location of the employer by the employee or consumer 124 and/or the hourly wage of the employee or consumer 124. In one embodiment, time spent at a known location of the employer is determined using a location services feature in the mobile device of consumer 124, such as with a GPS receiver 336 in a client device 128 producing GPS coordinates 340 that are sent to the banking server 136. In one embodiment consumer 124 transmits images of an electronic timesheet to the banking server 136. For those consumers 124 who do not earn income from hourly or salary based positions and instead earn income from project-based work, in one embodiment the banking server 136 collects pay information from consumer 124 via means of electronic notification from at least one of a 3rd party service provider, the benefactor of a project, an online marketplace of projects and labor, and the like. In one embodiment, the banking server 136 calculates pay information using project completion percentage and project price information.

In one embodiment, the payday 728 is at the end of a current pay period 528, as shown in FIG. 5B. In another embodiment, the payday 728 is some number of days or weeks following the end of a pay period 528, such that the consumer 124 is paid in arrears and as shown in FIG. 5C. When the consumer is paid, the employer server 116 transfers earned funds from an employer account (not shown) to the primary account 120 for the employee 124. Flow proceeds to block 732.

At block 732, the banking server 136 transfers funds from the primary account 120 to the secondary account 132, in response to the primary account 120 credited with consumer 124 earnings on the payday 728. In one embodiment, where the consumer 124 is not paid in arrears (i.e. the payday 728 occurs during the pay period 528), the amount of funds transferred is the purchase balance 416. In another embodiment, where the consumer 124 is paid in arrears (i.e. the payday 728 occurs after the pay period 528), the amount of funds transferred is at least a portion of the current purchase balance 420 (i.e. the purchases made during the pay period 528). The amount of funds that are transferred is either calculated automatically or selected by the consumer 124 as reflected in FIG. 5A or 13, respectively. The funds may be transferred on or after the payday 728. Flow proceeds to block 744.

At block 736, the consumer 124 earns fractional earnings 428, which may be hourly earnings, salaried earnings, project-based earnings, or earnings resulting from government benefit programs. Flow proceeds to block 740.

At block 740, the fractional earnings 428 and total accrued fractional earnings 512 are updated. Total accrued fractional earnings 512 are fractional earnings 428 for which a consumer 124 has not yet been paid. Flow proceeds to block 744.

At block 744, the banking server 136 adjusts the available spending limit 436. The adjustment to the available spending limit 436 is based on the total accrued fractional earnings 512, the purchase balance 416, and the secondary account balance 424. The available spending limit 436 is described in more detail with respect to FIG. 5A. Flow proceeds to decision block 748.

At decision block 748, the banking server 136 determines if the card statement due date 524 has been reached. If the card statement due date 524 has been reached, then flow proceeds to block 752. If instead the card statement due date 524 has not been reached, then flow proceeds to blocks 724, 728, and 736 to wait for either a new purchase transaction (block 724), a consumer payday (block 728), or new fractional earnings 428 by the consumer 124.

At block 752, the banking server 136 transfers up to the card account statement balance 516 from the secondary account 132 to the card account 144, on or before the card statement due date 524.

In an additional embodiment, the funds transfer occurs prior to the card statement due date 524. Delaying the payment of the purchase balance 416 increases the consumer's "Highest Credit Amount Extended" which can have a positive effect on the consumer's FICO score. For example, if the consumer 124 regularly purchases $250 per semi-monthly pay period 528, and his statement balance 516 is paid 2 weeks after receiving his statement, his "Highest Credit Amount Extended" would be $750, rather than $500 if the balance was paid upon receipt of the statement. In one embodiment, the card application provides the consumer 124 with an option to improve his/her credit score, by allowing the system to manage payments for the card account statement balance due 516 according to a calculated schedule. Such calculations include but are not limited to at least one of payment date, a consumer FICO score, a Highest Credit Amount Extended, a Spending Limit 432, a Credit Limit 412, income, total current debt, and the like. Flow proceeds to blocks 724, 728, and 736 to check for new purchase transactions, the consumer 124 being paid, or the consumer 124 earning fractional earnings 428, respectively.

Referring now to FIG. 8A, a diagram illustrating a Credit Example Based on Salaried Earnings in accordance with embodiments of the present invention is shown. FIGS. 8A-8F illustrate examples of calculating total accrued fractional earnings 512 and a spending limit 432, based on different circumstances for the employee or consumer 124.

For the example shown in FIG. 8A, the employee 124 is paid a salary where the fractional earnings 428 are $50 for each weekday. There are $0 fractional earnings 428 for each day of a weekend. Each pay period 528 for the employee is 2 weeks, and the payday 728 falls on the last weekday of each pay period 528. The credit limit 412 for the employee 124 is $100. The total accrued fractional earnings 512 increase at the end of each weekday by $50. At the end of the payday 728, the total accrued fractional earnings 512 are $0.

The banking server 136 calculates the total accrued fractional earnings 512 as a sum of the fractional earnings 428 for which the employee 124 has not yet been paid. Therefore, the total accrued fractional earnings 512 increases through the 2-week pay period 528 until the last day of the pay period 528 (payday 728). At the end of the payday 728, the total accrued fractional earnings 512 goes back to $0, and remains there until the end of the first day with fractional earnings 428, which is $Mon_3$. At that time, the total accrued fractional earnings 512 increases to $50, and increases from that time until the next payday 728 occurs.

The banking server 136 then calculates the spending limit 432 as credit limit 412+total accrued fractional earnings 512+secondary account balance 424. For this example, we assume the secondary account balance 424 is $0. The spending limit 432 increases as the total accrued fractional earnings 512 increase, and reset 804 to a minimum of $100, the credit limit 412, on payday 728.

Referring now to FIG. 8B, a diagram illustrating a Credit Example Based on Hourly Earnings in accordance with embodiments of the present invention is shown. For the example shown in FIG. 8B, the employee 124 is paid hourly where the fractional earnings 428 depend on how many hours are worked each day. There are $0 fractional earnings 428 for unworked days. Each pay period 528 for the employee 124 is 1 week, and the payday 728 falls on the Friday following each pay period 528. The credit limit 412 for the employee 124 is $100.

The total accrued fractional earnings 512 increase at the end of each weekday by the fractional earnings 428 earned that day. At the end of the payday 728 on day $Fri_2$, the total accrued fractional earnings 512 are $230. At the end of the payday 728 on day $Fri_3$, the total accrued fractional earnings 512 are $310.

The banking server 136 calculates the total accrued fractional earnings 512 as a sum of the fractional earnings 428 for which the employee 124 has not yet been paid. Therefore, the total accrued fractional earnings 512 increases through the 1-week pay period and days of work week 2 until the last day ($Fri_2$) of work week 2 (payday 728). At the end of the payday 728 for $Fri_2$, the total accrued fractional earnings 512 becomes $230 ($485−$255) since the employee 124 is paid for the first pay period ($255 ending on $Fri_1$). At that time, the total accrued fractional earnings 512 increases based on new fractional earnings 428, until the next payday 728 occurs on $Fri_3$.

The banking server 136 then calculates the spending limit 432 as credit limit 412+total accrued fractional earnings 512+secondary account balance 424. For this example, we assume the secondary account balance 424 is $0. The spending limit 432 increases as the total accrued fractional earnings 512 increase, and reset 804 to a minimum of $100, the credit limit 412, on payday 728.

Referring now to FIG. 8C, a diagram illustrating a Credit Example Based on Hourly Earnings in accordance with embodiments of the present invention is shown. For the example shown in FIG. 8C, the employee 124 is paid hourly where the fractional earnings 428 depend on how many hours are worked each day. There are $0 fractional earnings 428 for unworked days. Each pay period 528 for the employee 124 is 2 weeks, and the payday 728 falls on the last Friday of each pay period 528. The credit limit 412 for the employee 124 is $0. The total accrued fractional earnings 512 increase at the end of each weekday by the fractional earnings 428 earned that day. At the end of the payday 728 on day $Fri_2$, the total accrued fractional earnings 512 are $0.

The banking server 136 calculates the total accrued fractional earnings 512 as a sum of the fractional earnings 428 for which the employee 124 has not yet been paid. Therefore, the total accrued fractional earnings 512 increases through the 2-week pay period 528 and days of work weeks 1 and 2 until the last day ($Fri_2$) of work week 2 (payday 728). At the end of the payday 728 for $Fri_2$, the total accrued fractional earnings 512 becomes $0. At that time, the total accrued fractional earnings 512 increases based on new fractional earnings 428, until the next payday 728 occurs (not shown).

The banking server 136 then calculates the spending limit 432 as credit limit 412+total accrued fractional earnings 512+secondary account balance 424. For this example, we assume the secondary account balance 424 is $0. The spending limit 432 increases as the total accrued fractional earnings 512 increase, and reset 804 to $0, the credit limit 412, on payday 728.

Referring now to FIG. 8D, a diagram illustrating a Credit Example Based on Hourly Earnings in accordance with embodiments of the present invention is shown. For the example shown in FIG. 8D, the employee 124 is paid hourly where the fractional earnings 428 depend on how many hours are worked each day. There are $0 fractional earnings 428 for unworked days. Each pay period 528 for the employee 124 is 2 weeks, and the payday 728 falls on the last Friday of each pay period 528. The credit limit 412 for the employee 124 is $100. The total accrued fractional earnings 512 increase at the end of each weekday by the fractional earnings 428 earned that day. At the end of the payday 728 on day $Fri_2$, the total accrued fractional earnings 512 is $0.

The banking server 136 calculates the total accrued fractional earnings 512 as a sum of the fractional earnings 428 for which the employee 124 has not yet been paid. Therefore, the total accrued fractional earnings 512 increases through the 2-week pay period 528 and days of work week 2 until the last day ($Fri_2$) of work week 2 (payday 728). At the end of the payday 728 for $Fri_2$, the total accrued fractional earnings 512 becomes $0. At that time, the total accrued fractional earnings 512 increases based on new fractional earnings 428, until the next payday 728.

The banking server 136 then calculates the spending limit 432 as credit limit 412+total accrued fractional earnings 512+secondary account balance 424. For this example, we assume the secondary account balance 424 is $0. The spending limit 432 increases as the total accrued fractional earnings 512 increase, and reset 804 to a minimum of $100, the credit limit 412, on payday 728.

Referring now to FIG. 8E, a diagram illustrating a Credit Example Based on Semi-Monthly Government Benefits in accordance with embodiments of the present invention is shown. For the example shown in FIG. 8E, the consumer 124 is paid each day of the benefit period 528, which is semi monthly in this example. There are no "worked" or "unworked" days as with salaried or hourly employees. Each pay period 528 for the consumer 124 occurs twice every month, and the payday 728 falls on the last day of each benefit period 528. The credit limit 412 for the employee 124 is $100.

The banking server 136 calculates the spending limit 432 as credit limit 412+total accrued fractional earnings 512+secondary account balance 424. For this example, we assume the secondary account balance 424 is $0. The spending limit 432 increases as the fractional earnings 428 increase, and reset 808 to a minimum of $100, the credit limit 412, on payday 728.

Referring now to FIG. 8F, a diagram illustrating a Credit Example Based on Project Work in accordance with embodiments of the present invention is shown. Project work is different than either hourly work, salaried work, or government paid benefits since the consumer 124 is paid at the end of each project. Thus, paydays 728 tend to occur irregularly, at the end of each project of variable length. There are no "worked" or "unworked" days as with salaried or hourly employees. The credit limit 412 for the employee 124 is $100.

The banking server 136 calculates the spending limit 432 as credit limit 412+total accrued fractional earnings 512+secondary account balance 424. For this example, we assume the secondary account balance 424 is $0. The spending limit 432 increases as the fractional earnings 428 increase.

Referring now to FIG. 9, a diagram illustrating an Hourly Credit Example Based on a Two-Week Pay Period 528 in accordance with embodiments of the present invention is shown. The exemplary embodiment illustrated in FIG. 9 provides a detailed view of how fractional earnings 428 and an available spending limit 436 are calculated.

For the illustrated example, assume that an hourly employee 124 earns $16/hour, taxes and other deductions are 20% of earnings, and the accrued earnings fraction 408 is 50%. A detailed example of the calculations to determine the accrued earnings fraction 408 is shown in FIGS. 6A and 6B.

The example covers two work weeks, identified as work week 1 and work week 2. The pay period 528 is two work weeks, and in this example, work week 1 and work week 2 make up pay period 1 528. Days in work week 1 have a subscript of "1", and days in work week 2 have a subscript of "2". Each day, the employee 124 works a variable number of daily hours worked 904. Although full hour amounts are shown for simplicity, any portions of hours may be worked on any day.

The daily $ earned 504 is simply the daily hours worked 904 multiplied times the hourly pay rate ($16/hour). As previously indicated, taxes and deductions 508 are 20%, so each daily $ earned 504 is multiplied by 20% to obtain the daily taxes/deductions 508. The daily take-home pay 908 is the daily $ earned 504 minus the daily taxes/deductions 508.

Once the accrued earnings fraction 408 has been calculated, it is applied to the daily take-home pay 908 to obtain the fractional earnings 428. In the example shown the accrued earnings fraction 408 is 50%, but in other examples the accrued earnings fraction 408 may be different than 50%. Total accrued fractional earnings 512 is the sum of each of the fractional earnings 428. It should be understood that total accrued fractional earnings 512 is actually equal to a sum of the fractional earnings 428 for which a consumer 124 has not yet been paid, but the example of FIG. 9 does not include a payday 728, for clarity purposes. Therefore, in absence of a payday 728, the total accrued fractional earnings 512 are as shown.

In the illustrated example, the spending limit 432 is equal to the credit limit 412+(total accrued fractional earnings 512>credit limit 412)+the secondary account balance 424. However, since the secondary account balance 424 is not used in this example, only the credit limit 412 and total accrued fractional earnings 512 are used in the calculation. In other examples, the spending limit 432 calculation may be different than shown here.

The purchase balance 416 is simply the balance of all purchases made to date with the card. An initial $100 purchase has been made on Wed$_1$ of work week 1, followed by an additional $100 purchase (for a $200 purchase balance 416) on Sun$_2$ of work week 2. Given the calculation for available spending limit 436 shown in FIG. 5A, where available spending limit 436=spending limit 432–purchase balance 416, the available spending limit 436 increases as the difference between the spending limit 432 and purchase balance 416. The effect of paydays 728 on the available spending limit 436 is shown more clearly in the examples of FIGS. 10A-10F.

Referring now to FIG. 10A, a diagram illustrating a Credit Example Based on Salaried Earnings in accordance with embodiments of the present invention is shown. FIGS. 10A-10F illustrates examples of how the primary account 120 and secondary account 132 are managed by the banking server 136 while fractional earnings 428 are being accrued and purchases made. These examples also illustrate the available spending limit 436, which is the amount which the employee or consumer 124 can spend. It is assumed for all examples that the accrued earnings fraction 408 is 50% and the weeks shown are the first few weeks of card ownership, and no previous activity has occurred, for clarity.

For the example shown in FIG. 10A, the employee 124 is paid a salary of $1,000 per pay period 528, or $100/workday, where the fractional earnings 428 is $50 for each weekday. There are $0 fractional earnings 428 for each day of each weekend. Each pay period 528 for the employee 124 is 2 weeks, and the payday 728 falls on the last weekday of each pay period 528. The credit limit 412 for the employee 124 is $100.

The purchase balance 416 is the sum of purchases made to date that haven't been paid off. An initial $200 purchase is made on day Thurs$_1$ of work week 1. Because the example assumes the card account 144 is paid sometime beyond work week 3, the purchase balance 416 remains $200 through the end of work week 3. The spending limit 432 resets to the credit limit 412 ($100) at the end of the payday 728. The current purchase balance 420 is equal to the purchase balance 416–the secondary account balance 424. Since in this example the secondary account balance 424 is $0 until the payday 728, the current purchase balance 420 is the same as the purchase balance 416 until payday 728. Thereafter, the current purchase balance 420 becomes $0 since the purchase balance 416 ($200) is the same as the secondary account balance 424 ($200).

The spending limit 432 increases as the fractional earnings 428 increase. The banking server 136 calculates the available spending limit 436 as the spending limit 432—the purchase balance 416. The available spending limit 436 decreases by $200 beginning on Thurs$_1$, when the $200 purchase is made.

When the payday 728 occurs (Fri$_2$), the employer 116 deposits employee 124 earnings ($1,000/pay period) into the primary account 120. Once the earnings have been transferred into the primary account 120, the banking server 136 transfers the current purchase balance 420 ($200) from the primary account 120 to the secondary account 132. Finally, the banking server 136 debits the secondary account balance 424 by the current purchase balance 420 for the current billing period when a payment is made to the card account 144 (not shown). In an additional embodiment, an amount less than the current purchase balance 420 is transferred from the primary account 120 to the secondary account 132.

Referring now to FIG. 10B, a diagram illustrating a Credit Example Based on Hourly Earnings in accordance with embodiments of the present invention is shown. For the example shown in FIG. 10B, the employee 124 is paid hourly a variable amount each pay period 528, depending on the number of hours worked each day. There are $0 fractional earnings 428 for each unworked day. Each pay period 528 for the employee 124 is 2 weeks, and the payday 728 falls on the last weekday of each pay period 528. The credit limit 412 for the employee 124 is $100.

The purchase balance 416 is the sum of purchases made to date that haven't been paid off. An initial $200 purchase is made on day Thurs$_1$ of work week 1. Because the example assumes the card account 144 is paid sometime beyond work week 3, the purchase balance 416 remains $200 through the end of work week 3. The spending limit 432 resets to the credit limit 412 ($100) at the end of the payday 728. The current purchase balance 420 is equal to the purchase balance 416–the secondary account balance 424. Since in this example the secondary account balance 424 is $0 until the payday 728, the current purchase balance 420 is the same as the purchase balance 416 until payday 728. Thereafter, the current purchase balance 420 becomes $0 since the purchase balance 416 ($200) is the same as the secondary account balance 424 ($200).

The spending limit 432 increases as the fractional earnings 428 increase. The banking server 136 calculates the available spending limit 436 as the spending limit 432–the purchase balance 416. The available spending limit 436 decreases by $200 beginning on Thurs$_1$, when the $200 purchase is made.

When the payday 728 occurs (Fri$_2$), the employer 116 deposits employee 124 earnings ($970) into the primary account 120. Once the earnings have been transferred into the primary account 120, the banking server 136 transfers the current purchase balance 420 ($200) from the primary account 120 to the secondary account 132. Finally, the banking server 136 debits the secondary account balance 424 by the current purchase balance 420 for the current billing period when a payment is made to the card account (not shown). In an additional embodiment, an amount less than the current purchase balance 420 is transferred from the primary account 120 to the secondary account 132.

Referring now to FIG. 10C, a diagram illustrating a Credit Example Based on Hourly Earnings in accordance with embodiments of the present invention is shown. For the example shown in FIG. 10C, the employee 124 is paid hourly a variable amount each pay period 528, depending on the number of hours worked each day. There are $0 fractional earnings 428 for each unworked day. Each pay period 528 for the employee 124 is 2 weeks, and the payday 728 falls on the last weekday of each pay period 528. The credit limit 412 for the employee 124 is $0.

The purchase balance 416 is the sum of purchases made to date that haven't been paid off. An initial $200 purchase is made on day $Sat_2$ of work week 2. Because the example assumes the card account 144 is paid sometime beyond work week 3, the purchase balance 416 remains $200 through the end of work week 3. The spending limit 432 resets to the credit limit 412 ($0) at the end of the payday 728. The current purchase balance 420 is equal to the purchase balance 416–the secondary account balance 424. Since in this example the secondary account balance 424 is $0 until the payday 728, the current purchase balance 420 is the same as the purchase balance 416 until payday 728. Thereafter, the current purchase balance 420 becomes $0 since the purchase balance 416 ($200) is the same as the secondary account balance 424 ($200).

The spending limit 432 increases as the fractional earnings 428 increase. The banking server 136 calculates the available spending limit 436 as the spending limit 432–the purchase balance 416. The available spending limit 436 decreases by $200 beginning on $Sat_2$, when the $200 purchase is made.

When the payday 728 occurs ($Fri_2$), the employer 116 deposits employee 124 earnings ($860) into the primary account 120. Once the earnings have been transferred into the primary account 120, the banking server 136 transfers the current purchase balance 420 ($200) from the primary account 120 to the secondary account 132. Finally, the banking server 136 debits the secondary account balance 424 by the current purchase balance 420 for the current billing period when a payment is made to the card account 144 (not shown). In an additional embodiment, an amount less than the current purchase balance 420 is transferred from the primary account 120 to the secondary account 132.

Referring now to FIG. 10D, a diagram illustrating a Credit Example Based on Hourly Earnings in accordance with embodiments of the present invention is shown. For the example shown in FIG. 10D, the employee 124 is paid hourly a variable amount each pay period 528, depending on the number of hours worked each day. There are $0 fractional earnings 428 for each unworked day, and the available spending limit 432 does not increase until total accrued fractional earnings 512 exceed the credit limit of $100. Each pay period 528 for the employee 124 is 2 weeks, and the payday 728 falls on the last weekday of each pay period 528. The credit limit 412 for the employee 124 is $100.

The purchase balance 416 is the sum of purchases made to date that haven't been paid off. An initial $200 purchase is made on day $Sat_2$ of work week 2. Because the example assumes the card account 144 is paid sometime beyond work week 3, the purchase balance 416 remains $200 through the end of work week 3. The spending limit 432 resets to the credit limit 412 ($100) at the end of the payday 728. The current purchase balance 420 is equal to the purchase balance 416–the secondary account balance 424. Since in this example the secondary account balance 424 is $0 until the payday 728, the current purchase balance 420 is the same as the purchase balance 416 until payday 728. Thereafter, the current purchase balance 420 becomes $0 since the purchase balance 416 ($200) is the same as the secondary account balance 424 ($200).

The spending limit 432 increases as the fractional earnings 428 increase. The banking server 136 calculates the available spending limit 436 as the spending limit 432–the purchase balance 416. The available spending limit 436 decreases by $200 beginning on $Sat_2$, when the $200 purchase is made.

When the payday 728 occurs ($Fri_2$), the employer 116 deposits employee 124 earnings ($860) into the primary account 120. Once the earnings have been transferred into the primary account 120, the banking server 136 transfers the current purchase balance 420 ($200) from the primary account 120 to the secondary account 132. Finally, the banking server 136 debits the secondary account balance 424 by the current purchase balance 420 for the current billing period when a payment is made to the card account 144 (not shown). In an additional embodiment, an amount less than the current purchase balance 420 is transferred from the primary account 120 to the secondary account 132.

Referring now to FIG. 10E, a diagram illustrating a Credit Example Based on Semi-Monthly Government Benefits in accordance with embodiments of the present invention is shown. For the example shown in FIG. 10E, the consumer 124 earns the same daily amount each day of each semi-monthly pay period, and earns $600 per pay period 528. Each pay period 528 for the consumer 124 is semi-monthly. The credit limit 412 for the consumer 124 is $100, and the available spending limit 432 does not increase until total accrued fractional earnings 512 exceed the credit limit of $100, which occurs on day $Thurs_1$.

The purchase balance 416 is the sum of purchases made to date that haven't been paid off. An initial $200 purchase is made on day $Wed_2$. Because the example assumes the card account 144 is paid sometime in the future, the purchase balance 416 remains $200 through the end of the example. The spending limit 432 resets to the credit limit 412 ($100) at the end of the payday 728. The current purchase balance 420 is equal to the purchase balance 416–the secondary account balance 424. Since in this example the secondary account balance 424 is $0 until the payday 728, the current purchase balance 420 is the same as the purchase balance 416 until payday 728. Thereafter, the current purchase balance 420 becomes $0 since the purchase balance 416 ($200) is the same as the secondary account balance 424 ($200).

The spending limit 432 generally increases as the fractional earnings 428 increase, once the total accrued fractional earnings 512 exceed the credit limit 412. Thereafter, the spending limit 432 is equal to the credit limit 412+(total accrued fractional earnings 512 greater than the credit limit 412)–the secondary account 132 balance. The banking server 136 calculates the available spending limit 436 as the spending limit 432–the purchase balance 416. The available spending limit 436 decreases by $200 beginning on $Wed_2$, when the $200 purchase is made.

When the payday 728 occurs ($Sat_3$), the employer 116 deposits consumer 124 earnings ($600) into the primary account 120. Once the earnings have been transferred into the primary account 120, the banking server 136 transfers the current purchase balance 420 ($200) from the primary account 120 to the secondary account 132. Finally, the banking server 136 debits the secondary account balance 424 by the current purchase balance 420 for the current billing period when a payment is made to the card account 144 (not shown). In an additional embodiment, an amount less than the current purchase balance 420 is transferred from the primary account 120 to the secondary account 132.

Referring now to FIG. 11A, a diagram illustrating a Credit Example Based on Hourly Payment in Arrears in accordance with embodiments of the present invention is shown. The example illustrated in FIG. 11A continues on to FIG. 11B, where FIG. 11A illustrates work weeks 1-3 and FIG. 11B illustrates work weeks 4-6. For the example shown in FIGS. 11A and 11B, the employee 124 is paid $16/hour on a payday 728 one week after the end of the pay period 528 corresponding to the payday 728. The example assumes 20% daily taxes/deductions 508 and the accrued earnings fraction 408 is 50%. Each pay period 528 for the employee 124 is 2 weeks, and the payday 728 falls on the last weekday of the week following the end of each pay period 528. The credit limit 412 for the employee 124 is $100. Work weeks 1 and 2 make up pay period 1 528A, with the corresponding payday 1 728A on day $Fri_3$. Work weeks 3 and 4 make up pay period 2 528B, with the corresponding payday 2 728B on day $Fri_5$. Work weeks 5 and 6 make up pay period 3 528C, with the corresponding payday 728 sometime in the future (not shown). A card statement 1104 is provided to the employee 124 on day $Sat_5$, with the card account 144 payment (i.e. transfer from the secondary account 132 to the card account 144) made 1108 on day $Mon_6$.

The employee 124 works a variable number of daily hours worked 904. The total accrued fractional earnings 512 (abbreviated TAFE 512 for brevity) is a sum of the fractional earnings 428 for which the employee 124 has not been paid. The total accrued fractional earnings 512 increase daily according to daily hours worked 904, until the end of day $Thu_3$. So, on the day before payday 728, the total accrued fractional earnings 512 is equal to the sum of fractional earnings 428 for Work Week 1+Work week 2+Work Week 3=$672. The next day ($Fri_3$) is a payday 728A. Since the employee or consumer 124 is paid on the payday 728A, and the total accrued fractional earnings 512 is equal to the sum of fractional earnings 428 for which the employee or consumer 124 has not yet been paid, the total accrued fractional earnings 512 on day $Fri_3$ is equal to only the sum of fractional earnings 428 for work week 3=$230. Similarly, TAFE 512 increases through work weeks 4 and 5 until payday 2 728B, when it is reduced by the TAFE 512 on day $Fri_4$ ($486) and increased by the 8 hours of pay worked on day $Fri_5$.

The purchase balance 416 is the sum of purchases made to date that haven't been paid off. An initial $100 purchase is made on day $Wed_1$, followed by another $100 purchase on day $Sun_2$, a $150 purchase on day $Mon_3$, a $25 purchase on day $Wed_3$, an $80 purchase on day $Tue_4$, a $90 purchase on day $Tue_5$, a $150 purchase on day $Wed_5$, and a $50 purchase on day $Thu_6$. The purchase balance 416 decreases on day $Mon_6$ when a payment of $455 is made by transferring $455 from the secondary account 132 to the card account 144. $455 is the purchase balance 416 on the card statement 1104 on the day $Sat_3$ the card statement 1104 is presented to the employee or consumer 124. Therefore, the credit card statement balance due 516 of $455 is paid in full on the card statement due date 524 of $Mon_6$.

The spending limit 432 generally increases as the fractional earnings 428 increase, and in this case equals $100 (credit limit 412) until the total accrued fractional earnings 512 is greater than the credit limit 412 on day $Wed_1$. Thereafter, the spending limit 432 is equal to the credit limit 412+(total accrued fractional earnings 512 greater than the credit limit 412)+the secondary account 132 balance. The banking server 136 calculates the available spending limit 436 as the spending limit 432–the purchase balance 416. The available spending limit 436 decreases by $200 beginning on $Fri_1$, when the $200 purchase is made. Note that the available spending limit 436 decreases on payday 1 728A and payday 2 728B due to the decrease in TAFE 512 as a result of the consumer 124 being paid for the previous pay period 728. Essentially, cash in the consumer's primary account 120 reduces the need for credit, and with fewer unpaid earnings, less credit is extended to the consumer.

The secondary account balance 432 is used to pay the card account 144 on or before the card statement due date 524. The secondary account balance 424 increases each payday 728 when funds are transferred from the primary account 120 to the secondary account 132 (i.e. on payday 1 728A on day $Fri_3$ and on payday 2 728B on day $Fri_5$), for purchases made prior to a payday 728. The secondary account balance 424 decreases when the card account 144 is paid (i.e. CC payment 1108 on day $Mon_6$). The secondary account balance 424 is $0 through work weeks 1-3 until payday 1 728A, when $375 is transferred from the primary account 120 to the secondary account 132. $375 is the lesser of the current purchase balance 420 on the day before payday 1 728A (i.e. day $Thurs_3$) and the total accrued fractional earnings 512 on the last day of the corresponding pay period 528 (i.e. on day $Fri_t$ of work week 2). In an additional embodiment, an amount less than the current purchase balance 420 is transferred from the primary account 120 to the secondary account 132. The secondary account balance 424 is $375 through work weeks 4-5 until payday 2 728B, when $320 is transferred from the primary account 120 to the secondary account 132. $320 is the lesser of the current purchase balance 420 on the day before payday 2 728B (i.e. day $Thurs_5$) and the total accrued fractional earnings 512 on the last day of the corresponding pay period 528 (i.e. on day $Fri_4$ of work week 4). The secondary account balance 424 is reduced by $655 on day $Mon_6$ to make the credit card payment 1108. This leaves a secondary account balance of $240 in the secondary account 132.

The current purchase balance 420 is the purchase balance 416–the secondary account balance 424. Therefore, it tracks the purchase balance 416 through work weeks 1-3 until payday 1 728A, when it becomes $0 owing to the secondary account balance 424 being the same ($375) as the purchase balance 416. Thereafter, it again increases until payday 2 728B, when it again becomes $0.

Referring now to FIG. 12, a diagram illustrating a User Interface Displayed Credit Information Window in accordance with embodiments of the present invention is shown. The user interface window is displayed on the client device 128 when the client device 128 receives a credit information 1208 notification from the banking server 136 and presents the credit information 1208 to the employee or consumer 124. In one embodiment, the client device 128 receives the credit information 1208 notification each day. In another embodiment, the credit information 1208 notification may be received by the client device 128 whenever there is any of an approved purchase transaction, a payment is received by the primary account 120, a payment is received by the secondary account 132, or there is a change in the available spending limit 436. In another embodiment, the banking server 136 transfers updates to the client device 128 asynchronously as credit information 1208 changes, and the client device 128 includes an application 316 that displays 324 the updated credit information 1208 when the application 316 is invoked by the employee or consumer 124.

FIG. 12 represents one of many such possible examples, and such information can be presented in countless other ways without deviating from the scope and intent of the present application. Each of the fields and information shown may or may not be presented in other examples or presented in a similar fashion to that illustrated herein. The following description therefore applies to the illustrated example, and may or may not apply to other possible examples.

The user interface window may include a page exit control 1204, which terminates the displayed page and returns the display to a previous state (i.e. whatever was being displayed prior to the "Earned" window). The user interface page also includes some form of credit information 1208, from which the employee or consumer 124 may obtain current credit-related information 1208 related to the card usage. In one embodiment, the credit information 1208 includes a next pay date (i.e. a next payday 728), a current purchase balance 420, and an amount available to spend (i.e. the available spending limit 436). In another embodiment, the credit information 1208 may include any of the primary account 120 balance, the secondary account balance 424, the card account statement balance due 516, the total accrued fractional earnings 512, the spending limit 432, and the purchase balance 416. In other embodiments, less, more, or different information may be provided. Finally, the user interface may include a next page control 1212 or other control for navigation or other purposes.

Referring now to FIG. 13, a diagram illustrating a User Interface Payment Amount Selection Window in accordance with embodiments of the present invention is shown. The user interface payment selection window may be used for embodiments where the employee or consumer 124 is able to specify the amount of funds transferred from the primary 120 to the secondary 132 account on each payday 728. This embodiment may be beneficial to consumers 124 by helping to achieve a higher credit score or credit rating when more funds are transferred.

The payment amount selection window includes payment information 1308 that provides some information about the payment to be made that assists the employee or consumer 124 to understand the payment schedule and assess options for payment. In one embodiment, the payment information 1308 includes a payday 728 date, a selected amount 1304, and the card statement due date 524. In other embodiments, the payment information 1308 may include additional or different information. The payday 728 in most embodiments is the current date, since the notification producing the payment amount selection window is send from the banking server 136 to the client device 128 on the payday 728. The selected amount 1304 is the amount selected by the employee or consumer 124 using the payment identification control 1316 or other form of control. The employee or consumer 124 verifies the selected amount 1304 reflects their desires prior to activating the select control 1320. The payment date 524 is the date on the card statement at which the card account 144 will be paid from the secondary account 132.

In the example illustrated, a payment amount options slider 1312 is shown. This is a linear graphic including at least a minimum payment amount (i.e. current purchase balance at the end of the most recent completed pay period 1324) and a maximum amount (i.e. current purchase balance on the payday 1328). The example shows five potential payment amounts, including a minimum example amount of $200 and a maximum example amount of $450. A user (employee or consumer 124) selects the payment amount using the payment identification control 1316. Although the three intermediate steps do not show a corresponding payment amount, in some embodiments the payment amount for the intermediate payment amounts is displayed, as well. In another embodiment, only the minimum and maximum payment amounts are displayed on the payment amount options slider 1312, and a payment identification control 1316 is controlled by the employee or consumer 124 to select any dollar amount between the minimum 1324 and maximum 1328. The selected dollar amount would be displayed, such as in selected amount 1304 of payment information 1308.

Depending on the factors previously discussed, the minimum 1324 and maximum 1328 payment amounts may be calculated differently than shown in order to accommodate different credit-related objectives. Other user interface embodiments known in the art may equivalently provide a payment identification control 1316 function, including but not limited to selecting an item from a dropdown list, selecting an item with a radio button, typing in a selected payment amount, rotating a dial, etc.

In the embodiment illustrated, simply moving the payment identification control 1316 along the payment amount options slider 1312 does not select a payment amount, by itself. An employee or consumer 124 may change their mind while moving the payment identification control 1316 or may accidentally move the payment identification control 1316 to a non-desired payment amount. Once the employee or consumer 124 is satisfied the payment identification control 1316 position reflects the desired payment amount (for example, by verifying the correct selected amount 1304), the employee or consumer 124 activates the select control 1320, which selects the payment amount identified by the payment identification control 1316 and transmits the selection to the banking server 136. The banking server 136 then schedules the card account 144 payment at the card statement due date 524 for the selected amount 1304.

A mechanism for providing a card account management system that allows consumers to reserve funds to pay their card bill has been described. It will be appreciated by those skilled in the art that the system and method of the present invention can be used in environments other than those disclosed herein. It will thus be appreciated by those skilled in the art that other variations of the present invention will be possible without departing from the scope of the invention as disclosed. These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

The descriptions and figures included herein depict specific embodiments to teach those skilled in the art how to make and use the best option. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method comprising:
   establishing a card account for a consumer;
   authorizing, by a banking server, transfer of funds from a primary account to a secondary account, the primary account storing wage earnings for the consumer, and the secondary account comprising a secondary account balance for storing funds to pay a card account statement balance;
   determining, by a geofencing feature of a consumer device, time spent at an employer location, the consumer device comprising a GPS receiver producing GPS coordinates, and the geofencing feature comparing the GPS coordinates to employer location boundaries and measuring a cumulative time the GPS coordinates are within the employer location boundaries;
   determining, by the banking server, consumer wage earnings based on the time spent within the employer location boundaries;
   determining, by the banking server, an available spending limit for the card account equal to a spending limit minus a purchase balance, the spending limit comprising total accrued fractional earnings greater than a credit limit, the total accrued fractional earnings comprising a sum of fractional earnings, and fractional earnings comprising a predetermined fraction of the consumer wage earnings;
   approving, by the banking server, one or more purchase transactions for the card account not greater than the available spending limit;
   crediting, by an employer server, the primary account with the consumer wage earnings on a payday; and
   in response to the primary account credited with the consumer wage earnings on a payday, adjusting, by the banking server, the available spending limit for the card account based on the total accrued fractional earnings, the purchase balance, and the secondary account balance.

2. The method of claim 1, further comprising:
   transferring an amount comprising a portion of the purchase balance from the primary account to the secondary account on or after the payday; and
   transferring up to the card account statement balance from the secondary account to the card account on or before a card account statement due date.

3. The method of claim 2, wherein the card account comprises the secondary account, the method further comprising:
   applying the transferred amount corresponding to the portion of the purchase balance to the card account on or before the card account statement due date.

4. The method of claim 2, wherein the portion of the purchase balance transferred is equal to the lesser of:
   a current purchase balance and a sum of fractional earnings of a pay period corresponding to the payday.

5. The method of claim 1, wherein the predetermined fraction is based on average consumer wage earnings and financial obligations for the consumer.

6. The method of claim 1, further comprising:
   setting a credit limit for the card account, wherein the available spending limit is based on the purchase balance, the credit limit, a sum of fractional earnings for which the consumer has not been paid, and the secondary account balance.

7. The method of claim 1, further comprising:
   notifying the consumer of a current purchase balance based on a difference between the purchase balance and the secondary account balance;
   receiving, from the consumer, a selected payment amount comprising an amount at or between the current purchase balance at an end of a pay period and the current purchase balance on the payday;
   transferring the selected payment amount from the primary account to the secondary account on or after the payday; and
   transferring up to the card account statement balance from the secondary account to the card account on or before a card account statement due date.

8. A system, comprising:
   a network;
   a merchant device, coupled to the network, configured to perform one or more purchase transactions for a consumer using a card account;
   a secondary account, coupled to the network;
   a consumer device, coupled to the network, comprising:
     GPS receiver that produces OPS coordinates; and
     geofencing feature, the geofencing feature configured to:
       measure an amount of time the consumer device is within boundaries of an employer location,
       compare the GPS coordinates to the boundaries of the employer location, and
       measure a cumulative time the GPS coordinates are within the boundaries of the employer location;
   a banking server, coupled to the network, configured to:
     determine consumer wage earnings based on the amount of time the consumer device is within the boundaries of the employer location; and
     approve the one or more purchase transactions not greater than an available spending limit for the card account, the available spending limit equal to a spending limit minus a purchase balance, the spending limit comprising a sum of a credit limit, total accrued fractional earnings greater than the credit limit, and a balance of the secondary account, the total accrued fractional earnings comprising a sum of fractional earnings, and the fractional earnings comprising a predetermined fraction of the consumer wage earnings; and
   an employer server, coupled to the network, configured to:
     transfer the consumer wage earnings to a primary account on a payday; and
     in response to the employer server configured to transfer the consumer wage earnings, the banking server is further configured to:
       transfer an amount comprising a portion of the purchase balance of the card account from the primary account to the secondary account on or after the payday; and
       transfer up to a card account statement balance from the secondary account to the card account on or before a card statement due date.

9. The system of claim 8, wherein the card account comprises the secondary account, and wherein the banking server is further configured to:
   apply the transferred amount corresponding to the portion of the purchase balance to the card account on or before the card statement due date.

10. The system of claim 8, wherein the portion of the purchase balance transferred is equal to the lesser of:

a current purchase balance and a sum of fractional earnings of a pay period corresponding to the payday.

11. The system of claim 8, wherein the predetermined fraction is based on average consumer wage earnings and financial obligations for the consumer.

12. The system of claim 8, the banking server being further configured to:
   establish the card account for the consumer;
   authorize transfers from the primary account to the secondary account, the primary account storing wage earnings for the consumer, and the secondary account comprising a secondary account balance for paying the card account statement balance;
   set a credit limit for the card account;
   determine an available spending limit for the card account; and
   adjust the available spending limit based on the credit limit, a sum of fractional earnings for which the consumer has not been paid the purchase balance, and the secondary account balance.

13. The system of claim 8, further comprising:
   the consumer device, coupled to the network, comprising an application configured to display one or more of:
   the available spending limit, a current purchase balance based on the purchase balance and the secondary account balance, and a date of a next payday.

14. The system of claim 13, wherein the banking server is further configured to:
   provide a notification to the consumer device of the current purchase balance;
   receive, from the consumer device, a selected payment amount comprising an amount at or between the current purchase balance at the end of a pay period and the current purchase balance on the payday;
   transfer the selected payment amount from the primary account to the secondary account on or after the payday; and
   transfer up to the card account statement balance from the secondary account to the card account on or before the card statement due date.

15. A non-transitory computer readable storage medium configured to store instructions that when executed cause a processor to:
   establish a card account for a consumer;
   authorize transfer of funds from a primary account to a secondary account, the primary account storing wage earnings for the consumer, and the secondary account comprising a secondary account balance for storing funds to pay a card account statement balance;
   determine, by a geofencing feature of a consumer device, time spent at an employer location, the consumer device comprising a OPS receiver that produces GPS coordinates, and the geofencing feature that compares the GPS coordinates to employer location boundaries and measures a cumulative time the GPS coordinates are within the employer location boundaries;
   determine consumer wage earnings based on the time spent within the employer location boundaries;
   determine an available spending limit for the card account equal to a spending limit minus a purchase balance, the spending limit comprising a sum of a credit limit, total accrued fractional earnings greater than the credit limit, and the secondary account balance, the total accrued fractional earnings comprising a sum of fractional earnings, and fractional earnings comprising a predetermined fraction of the consumer wage earnings;
   approve one or more purchase transactions for the card account not greater than the available spending limit;
   credit the primary account with the consumer wage earnings on a payday; and
   in response to the primary account credited with the consumer wage earnings on a payday, adjust the available spending limit for the card account based on the total accrued fractional earnings, the purchase balance for the card account, and the secondary account balance.

16. The non-transitory computer readable storage medium of claim 15, further configured to store instructions that when executed cause a processor to:
   transfer an amount comprising a portion of the purchase balance from the primary account to the secondary account on or after the payday; and
   transfer up to the card account statement balance from the secondary account to the card account on or before a card account statement due date.

17. The non-transitory computer readable storage medium of claim 16, wherein the card account comprises the secondary account, the non-transitory computer readable storage medium storing instructions that when executed cause a processor to:
   apply the transferred amount corresponding to the portion of the purchase balance to the card account on or before the card account statement due date.

18. The non-transitory computer readable storage medium of claim 16, wherein the portion of the purchase balance transferred is equal to the lesser of:
   a current purchase balance and a sum of fractional earnings of a pay period corresponding to the payday.

19. The non-transitory computer readable storage medium of claim 15, wherein the predetermined fraction is based on average consumer wage earnings and financial obligations for the consumer.

20. The non-transitory computer readable storage medium of claim 15, further configured to store instructions that when executed cause a processor to:
   notify the consumer of a current purchase balance based on a difference between the purchase balance and the secondary account balance;
   receive, from the consumer, a selected payment amount comprising an amount at or between the current purchase balance at an end of a pay period and the current purchase balance on the payday;
   transfer the selected payment amount from the primary account to the secondary account on or after the payday; and
   transfer up to the card account statement balance from the secondary account to the card account on or before a card account statement due date.

* * * * *

UNITED STATES PATENT AND TRADEMARK OFFICE
CERTIFICATE OF CORRECTION

PATENT NO.         : 10,572,862 B2                             Page 1 of 1
APPLICATION NO.    : 15/886737
DATED              : February 25, 2020
INVENTOR(S)        : Timothy L. Robinson et al.

It is certified that error appears in the above-identified patent and that said Letters Patent is hereby corrected as shown below:

In the Claims

Column 28: Claim 8, Lines 7-10 should read:
a consumer device, coupled to the network, comprising:
a GPS receiver that produces GPS coordinates; and
a geofencing feature, the geofencing feature configured to:

Column 29: Claim 15, Line 12 should read:
device comprising a GPS receiver that produces GPS Signed and Sealed this
Thirty-first Day of March, 2020

Andrei Iancu
*Director of the United States Patent and Trademark Office*